(12) United States Patent
Takeda et al.

(10) Patent No.: US 6,336,250 B1
(45) Date of Patent: Jan. 8, 2002

(54) SPRING HINGE FOR EYEGLASSES

(75) Inventors: Kinji Takeda; Yukiko Kori, both of Fukui (JP)

(73) Assignee: Kabushiki Kaisha Takeda Kikaku, Fukui-Ken (JP)

( * ) Notice: Subject to any disclaimer, the term of this patent is extended or adjusted under 35 U.S.C. 154(b) by 0 days.

(21) Appl. No.: 09/437,340

(22) Filed: Nov. 10, 1999

(30) Foreign Application Priority Data

Nov. 10, 1998 (JP) ............................................. 10-319616

(51) Int. Cl.⁷ ................................................ G02C 5/22
(52) U.S. Cl. ........................ 16/228; 351/113; 351/153
(58) Field of Search ........................... 16/228; 351/113, 351/151, 153

(56) References Cited

U.S. PATENT DOCUMENTS

| | | | | |
|---|---|---|---|---|
| 2,087,502 A | * | 7/1937 | Chylack | 351/113 |
| 3,102,156 A | * | 8/1963 | O'Dea | 351/153 X |
| 3,145,254 A | * | 8/1964 | McCulloch | 351/153 X |
| 3,899,840 A | * | 8/1975 | Maillet | 351/113 |
| 3,923,384 A | * | 12/1975 | Leblanc | 351/113 |
| 4,618,226 A | * | 10/1986 | Sartor et al. | 351/113 |
| 4,793,024 A | * | 12/1988 | Pivetta | 16/228 |
| 4,951,349 A | * | 8/1990 | Dietrich et al. | 16/228 |
| 5,666,181 A | * | 9/1997 | Conway | 351/113 |
| 5,818,567 A | * | 10/1998 | Sakai | 351/113 |
| 6,019,467 A | * | 2/2000 | Kawamoto | 351/153 X |

* cited by examiner

Primary Examiner—Lynne H. Browne
Assistant Examiner—David E. Bochna
(74) Attorney, Agent, or Firm—Ronald E. Greigg

(57) ABSTRACT

A spring hinge for eyeglasses comprising a spring member provided on the side of the temple; the spring member having a flexible press portion for flexibly pressing, from the inside of the armor, an arc periphery of the intermediate connecting member which arc periphery is formed by a center of the pivot shaft.

7 Claims, 36 Drawing Sheets

SPRING HINGE FOR EYEGLASSES

BACKGROUND OF THE INVENTION

(1) Field of the Invention

This invention relates to a spring hinge for eyeglasses which enables a temple to fit onto a temporal and to open and close with a moderate resistance.

(2) Prior Art

In order to solve a problem of splipping down of eyeglasses due to perspiration on a face, a spring hinge with a structure for fitting onto a temporal was conventionally provided.

As shown in FIGS. 35 to 37, for example, the spring hinge had a structure in which an armor-side hinge member (c) comprising a joint member (b) projectingly mounted to a pedestal (a) and a temple-side hinge member (e) with a spring coil (d) inside and a screw (f) by which the armor-side hinge member (c) and the temple-side hinge member (e) were pivotally connected to each other so that they could be opened and closed.

To be more specific, as shown in FIGS. 36 and 37, the temple-side hinge member (e) was so structured that a sliding body (h) of a sliding member (j) comprising a joint member (i) projectingly mounted to the tip of the sliding body (h) was contained in a case (g) which was formed long and narrow in a direction of length of a temple and one end of the case is kept open. Further, at the end of the above mentioned case (g), an engaging pin (u) was mounted to walls (k,k) facing to each other, and the coil spring (d) was mounted between the engaging pin (u) and a spring support member (m) mounted at the rear end of the above mentioned sliding body (h), so that a certain length of the sliding body (i) could be drawn from the case (g) against elasticity compression of the coil spring (d).

Furthermore, in order to fix the temple-side hinge member (e) to a temple (n), the inner surface of the rip of the temple (n) was cut off at a part facing to an outside opening of the case (g) to form a concavity (o), a periphery (p) of the opening of the case (g) was put into contact with a periphery (q) of the concavity (o), and the joint thereof was brazed. The concavity (o) was formed with an intention to reduce the thickness of the case (g) as much as possible by jointly using a containable space (r) of the case (g) and the concavity (o).

As mentioned above, the conventional spring hinge was a sliding-type spring hinge in which the armor-side hinge member (c) and the temple-side hinge member (e) were connected to each other by a screw (f), and a sliding body (h) was constructed to be slidable by receiving momentum of the coil spring (d), however, there were the following problems.

As the other form of the above mentioned spring hinge, a spring hinge provided with a plate spring is presented as publisized in the laid-open patent No. 10-133153. The plate spring hinge has a structure in which an armor-side joint member (B) mounted to an armor (A) and a temple-side joint member (D) mounted to a temple (C), are combined with each other as shown in FIG. 38. The armor-side joint member (B) has a joint portion (F) which projects at a position apart from an inner surface (E) of the armor, and an oblong pin hole (G) is provided at the joint portion (F). The above mentioned temple-side joint member (D) consists of a box-shaped support pedestal (H) projectingly mounted on the inner surface of the temple, and a plate spring (I) is projectingly mounted forward while the plate spring (I) is fixed at a rear end of the box-shaped support pedestal (H).

When a front end (J) of the plate spring (I) is in contact with an outer surface (K) of the joint portion (F), the temple (C) presents an unfolded state, in which the joint members (B) and (D) are pivotally mounted to each other with a screw pin (L) which pierces the pinhole of the temple-side joint member (D) and the oblong pinhole (G).

An outward unfolding action of the temple (C) is done by the above mentioned joint portion (G) which flexibly transforms the above mentioned plate spring (I). In this occasion, the above mentioned screw pin (L) moves along the oblong pinhole (G) as shown in FIG. 39. When the temple (C) is folded, a corner tip (M) of the above mentioned joint member (G) comes into contact at a joint with the front end (J) of the plate spring (I) which causes flexible transformation of the plate spring (I). When the temple (C) is folded to a certain extent as shown in FIG. 40, the temple (C) is flexibly and quickly turned by the momentum action of the plate spring (I) a shown in FIG. 41, then finally comes to a folded state with the tip (N) being in contact with the lense rim (O) as shown in FIGS. 41 and 42. Under this folded state, the above mentioned corner tip (M) of the joint member (F) is also in contact at a joint with the above mentioned front end (J) as shown in FIG. 42.

As mentioned above, the former spring hinge using a coil spring (d) was a slide-type spring hinge in which the armor-side hinge member (c) and the temple-side hinge member (e) were connected to each other by a screw (f), and a sliding body (h) was constructed to be slidable by receiving momentum of the coil spring (d), however, there were the following problems.

① The above mentioned spring hinge was so constructed that the sliding body (h) equipped with the coil spring (d) was placed in the case (g). Therefore, even if the concavity (o) was provided as shown in FIG. 37, the case (g) in a box shape structurally occupying a certain space considerably projected at the inside of the temple (n), which was conspicuous, wherefore there was a problem of bad appearance.

Further, in recent years, since great importance is attached to light weight eyeglasses, slenderly structured eyeglasses are highly regarded such as eyeglasses with slender temples, rimless eyeglasses so-called "two-point", in which temples are directly connected to lenses, rimless eyeglasses in which lenses are supported with cord which is connected to curving frames. However, in such slender temples to form slim eyeglasses, it was difficult to install the above mentioned box-shaped spring hinge in respect of space for installation. Even if the installation was possible, the spring hinge did not match the slender temples in respect of size, and was against a requirement of updated fashion of eyeglasses in recent years in which great importance is attached also to visual impression of light weight. Further, in the spring hinge with the above mentioned structure since the momentum of the coil spring was strong, there were such fears that a lense was burdened when the temple opened flexibly and the rim might be deformed or the lense might be broken.

② Furthermore, as mentioned above, the conventional spring hinge was so constructed that the armor-side member (c) and the temple-side hinge member (e) were connected to each other by the screw (f) so that the both members could be opened and closed. However, each time the temple was opened and closed, rotational action worked on the screw (f) while the eyeglasses are in use, by which the screw might loosen and the temple (n) might fall by its self-weight without intension of a wearer of the eyeglasses. As a result of repeatedly happening of this kind of event, there was a fear that plating of a lense rim (t) might fall off with the shock caused by an end (s) of the temple (n) colliding with the lense rim (t). In addition, there was a fear that the lense and the modern might be damaged.

As described above, in the conventional spring hinge, improvement in fitting performance of the temple by spring action, was taken into consideration, however, the spring action had nothing to do at all with dissolution of the above mentioned problem accompanied by the unintended fall of the temple.

The latter spring hinge provided with the plate spring (J) also had problems as mentioned below.

① Since the plate spring (I) is flexibly transformed each time the temple is folded and unfolded as shown in FIG. 40, there was a problem that the spring action of the plate spring was easy to be deteriorated.

In addition, since the above mentioned flexible transformation of the plate spring (I) is done by the corner tip (M) of the joint portion (F) pressing the plate spring (I) while the plate spring (I) and the corner tip (M) are in contact at a point with each other as shown in FIG. 40, there was a problem that the joint portion (F) and the plate spring (I) were easy to wear because of a pressing force at a point during folding and unfolding actions of the temple. Because of repeat of such flexible transformation and wear of the plate spring as mentioned above, the spring hinge provided with the plate spring was inferior in terms of durability, and had no practical use as a spring hinge which must guarantee frequent folding and unfolding actions of the temple.

② Further, when the temple is folded, the temple quickly turns toward the folding direction by the spring force of the plate spring (I) after passing the state as shown in FIG. 40, and the tip (N) of the temple collides with the lense rim (O) and/or the lense, and so on, by which there was a problem that plating of the lense rim was easy to fall off and/or the lense and the modern are easy to be damaged.

③ Furthermore, since folding and unfolding of the temple is accompanied by the flexible transformation of the plate spring (I), the above mentioned temple-side joint member (D) is constituted using the box-shaped support pedestal (H) which substantially projects at the inside (P) of the temple taking room for the flexible transformation into consideration.

Therefore;

1) Because the plate spring (I) being mounted to form a pressing state against the joint member (F) from the outside of the armor bends and transforms when the temple is folded and unfolded as mentioned above, a thickness of the box-shaped pedestal (H) is determined so that the thickness can be cover the bending volume. However, since the bend and the transformation is substantial, the box-shaped support pedestal has to be made substantially projectingly toward the inside of the temple. Further, since the screw pin (L) moves back and forth within the oblong pinhole (G) when the temple is folded and unfolded, the spring hinge as a whole has to be made long to and fro. Furthermore, a tall armor-side joint member (B) provided with the projecting joint portion (F) at a place apart from the inner surface of the armor was required.

For the above reasons, a special space became required at the inside of the plate spring and the backside of the plate spring and waste of space was brought about, which led to large-sized of the spring hinge. And, because of this enlarged spring hinge, there was a problem that the spring hinge was conspicuous and so presented very bad appearance.

2) In recent years, since great importance is attached to light weight eyeglasses, slenderly structured eyeglasses are highly regarded such as eyeglasses with slender temples, rimless eyeglasses so-called "two-point", in which temples are directly connected to lenses, and rimless eyeglasses in which lenses are supported with a cord which is connected to curving frames. However, in such slender temples to form slim eyeglasses, it was difficult to install a joint member provided with the above mentioned large-sized box-shaped support pedestal in terms of space for installation. Even if the installation was possible, it did not match the slender temples in terms of the size, and was against a requirement of updated fashion of eyeglasses in recent years in which great importance was attached to visual impression of light weight.

3) Further, since the plate spring flexibly transforms each time the temple is folded and unfolded, and the plate spring is easy to wear by the pressing force under the above mentioned contacting state at a point, it is considered that the plate spring with more than a certain thickness should be provided. However, in case such a thick plate spring is provided, as the momentum of the plate spring is strong, there were such fears that a lense was burdened substantially when the temple is flexibly unfolded and the lense rim might be deformed or the lense might be broken. For these reasons, the spring hinge provided with the plate spring was not able to be adopted to a slender temple.

4) Furthermore, in case the spring hinge is provided with the plate spring, when expansion of a design of eyeglasses are intended, it is required to design and manufacture the box-shaped pedestal individually according to the length of the plate spring and the volume of bend. In addition, since the spring hinge is so constituted that the front end of the plate spring is pressed against the joint portion at the outside of the armor, it is required that the joint portion (F) should be mounted to a place which is widely apart inward from the inner surface (E) of the armor as shown in FIG. 38, and the tall and special armor-side joint member (B), which is mounted substantially apart from the inner surface of the armor, is also required. As such the structure of the spring hinge became extremely special. Therefore, the structure naturally brought about increase in manufacturing const. Even when diversification of a form of spring hinge was intended, the diversification was difficult due to increase in manufacturing cost, and there was a problem that expansion of a design of eyeglasses was difficult also in this respect.

SUMMARY OF THE INVENTION

An object of this invention is to solve the following problems and to enable a temple to fit onto a temporal while the eyeglasses are in use by utilizing a required momentum action of a spring member.

Namely, the object of this invention relation to the former spring hinge provided with a coil spring is: ① to form the whole spring hinge compact to present a good appearance, ② to have the momentum of the spring constituting the spring hinge effectively function for improving fitness of the temple onto the temporal and for prevention of unprepared fall of the temple, and of damages to the lense rim, the lense, and the modern, ③ to provide a spring hinge which can be mounted even to a slender temple while maintaining a good appearance and at the same time which can provide an appropriate momentum action according to a design of the temple, by which to improve fashion of the eyeglasses with slender temples and to improve function of a slender temple, i. e. to attain fitness onto a temporal and better folding and unfolding action of a slender temple which were not able to be attained in the past, and ④ to make the spring hinge simple without causing unnecessary flexible transformation of the spring member to attempt to cut a cost, and to attempt to diversify a design of eyeglasses by simplifying the structure.

According to the present invention, a spring hinge for eyeglasses in which upper and lower connecting members are provided at a temple side to face to each other leaving a predetermined distance in up and down directions, an intermediate connecting member provided at a side of an armor to be inserted between the upper and lower connecting members, and a pivot shaft for pivotably connecting the upper and lower connecting members and the intermediate connecting member, so that a temple may be folded from a predetermined state of open, comprises a spring member provided on the side of the temple; said spring member having a flexible press portion for flexibly pressing, from the inside of the armor, an arc periphery of the intermediate connecting member which arc periphery is formed by a center of the pivot shaft, thereby the temple in the predetermined opened state may be folded and opened while keeping the flexible pressing state. And, folding and opening of the temple, in a state that the flexible press portion contacts the arc periphery of the intermediate member, is carried out not to make flexible deformation of the spring member. Further, a rear portion of the armor presses the spring member from its outside to its inside so as to flexibly deform or transform the spring member when the temple in a predetermined open state is opened outwardly.

By the way, it is preferable that the spring member is formed to be a line having flexibility and its front portion is formed to be the flexible press portion and its rear end portion or a portion of the spring member adjacent its rear end portion is attached on the side of the temple. In this case, it is preferable that a portion of the flexible press portion, which contacts the arc periphery of the intermediate connecting member, is formed to have a curved face which contacts the arc periphery with contact of face to face.

Another aspect of the spring hinge according to this invention is as follows.

The spring hinge for eyeglasses in which upper and lower connecting members are provided at an armor-side to face to each other leaving a predetermined distance in up and down directions, an intermediate connecting member provided at a side of an armor to be inserted between the upper and lower connecting members, and a pivot shaft for pivotably connecting the upper and lower connecting members and the the intermediate connecting member, so that a temple may be folded from a predetermined state of open, comprises a spring member provided on the side of the armor; said spring member having a flexible press portion for flexibly pressing, from the inside of the temple, an arc periphery of the intermediate connecting member which arc periphery is formed by a center of the pivot shaft, thereby the temple in the predetermined opened state may be folded and opened while keeping the flexible pressing state, and folding and opening of the temple, in a state that the flexible press portion contacts the arc periphery of the intermediate member, is carried out not to make flexible deformation or transformation of the spring member, and also a rear portion of the armor presses the spring member from its outside to its inside so as to flexibly deform the spring member when the temple in a predetermined open state is opened outwardly.

Further, it is preferable that the spring member is formed to be line having flexibility and its front portion is formed to be the flexible press portion and its rear end portion or a portion of the spring member adjacent its rear end portion is attached on the side of the temple. In this case, it is preferable that a portion of the flexible press portion, which contacts the arc periphery of the intermediate connecting member, is formed to have a curved face which contacts the arc periphery with contact of face to face.

Advantages

The spring hinge according to the present invention has the following effects as well as the advantages that the temple fits onto a temporal while the eyeglasses are in use just like the conventional spring hinge, and in case an object hits the eyeglasses while they are in use, the temple are flexibly expanded and opened to avoid the lenses from breaking.

(1) The spring hinge according to this invention is different from the conventional slide-type spring hinge in a sense that the former utilizes flexibility transformation only, wherefore the structure can be simple and compact. Further, improvement in manufacturing efficiency and reduction in manufacturing cost can also be expected.

The spring hinge can be formed so compact that the spring hinge can be attached well even to a slender temple in terms of appearance, and by fixing a requirement momentum by changing a diameter of a spring, momentum action which is appropriate for a type of a temple, can be obtained. Because of the above mentioned reasons, the flexible expansion and opending force of a temple does not work too much on a lense even in a slender temple. As mentioned above, since the force does not work too much on a lense, even in eyeglasses with a slender structure such as rimless eyeglasses so-called "two-point", in which lenses are directly connected to lenses, and rimless eyeglasses in which lenses are supported with a cord which is connected to curving frames, fears such as breakage of lenses and a bend and deformation of curving frames can be prevented.

As described above, this invention is particularly effective to frames of eyeglasses with slender temples, and can attain improvement in function as well as in fashion.

As the above mentioned spring constituting the spring hinge according to this invention has a structure in which a flexibly press portion of the spring member, flexibility presses an arc periphery of the above mentioned intermediate connecting member, the temples in an unfolded state expanding backwards can be opened and closed with a moderate resistance while maintaining the above mentioned flexibly pressing state.

For the above mentioned reasons, unprepared fall of the temple as in the past can be prevented, falling off of plate of a rim, breakage of a lense, damage to a modern, all of which are caused by the unprepared fall of temples, can be prevented.

(2) According to the invention claimed in claim 1 in particular, as well as attaining fitness of a temple onto a temporal when the eyeglasses are in use by a momentum action accompanied by the flexible transformation of the spring member, the above mentioned problems are solved providing the following remarkable effects which can not be attained by the above mentioned spring hinge provided with the plate spring when the temple is folded and unfolded.

Namely, in the invention of claim 1, since it is adopted that the intermediate connecting member provides an arc periphery which is formed about a pivot shaft and it is so composed that the flexible press portion of the spring member flexibly presses the arc periphery always and that folding and unfolding of the temple while the flexible press portion contacts the arc periphery under pressure, it becomes possible to carry out folding and unfolding of the temple without causing unnecessary flexible transformation of the spring member.

Therefore:

①There is no fear that the spring member is deteriorated as in the above mentioned spring hinge in which the plate spring flexibly transforms each time the temple is folded and unfolded. In addition, when the temple is folded and unfolded, since it does not happen that the corner tip of the joint portion presses the spring member at a point, wear of the spring member and the intermediate connecting member is controlled by which durability of the spring hinge can be improved.

②Further, the temple can turn smoothly under a certain fixed flexible pressure when the temple is folded. Therefore, there is an advantage that no such problems are caused as damages on plating of the lense rim, the lense, and the modern, which are caused by a shock at a time when the temple finishes being folded, being accompanied by the quick turn of the temple toward the folding direction as in the spring hinge provided with the plate spring.

③Furthermore, in the spring hinge according to this invention, since there is no fear that the spring hinge is flexibly deformed or transformed and is deteriorated at times of holding and unfolding of the temple as in the spring hinge provided with the plate spring, it is not necessary to enlarge the size of the spring member to secure a spring function, and the thickness of the spring member can be determined minimum. Still further, since the spring member stays still at times of folding and unfolding of the temple (the spring member does not transform), the spring hinge can be made compact, and the box-shaped support pedestal with a certain high and the tall armor-side joint member provided with an oblong pinhole, etc., which are required for the flexible transformation of the spring member are not required in this invention wherefore the spring hinge can also be made compact.

Therefore, according to this invention as claimed in claim 1, the spring hinge can be made compact showing a good appearance and matching even for the slender temple, while diversification in design can be attained, and the requirement for updated fashion of eyeglasses in these days, in which great importance is attached also to visual impression of light weight, can satisfactorily met.

④In addition, since specially structured parts such as the joint member provided with the oblong pinhole, the tall armor-side joint member provided with the joint portion, and the box-shaped support pedestal of a required size which fits into the length of the plate spring and the volume of bend are not required, a cut in manufacturing cost and diversification of the design can be attained.

(3) As regards to the invention claimed in claim 2, a difference from the invention claimed in claim 1, is that the intermediate connecting member is mounted to the temple-side in claim 2 while the intermediate connecting member is mounted to the armor-side in claim 1, the peculiar effects of which are the same as the invention claimed in claim 1.

(4) In the invention claimed in claim 3, the spring member in the invention claimed in claim 1 is formed in a line, the peculiar effects of which is the same as the invention claimed in claim 1. However, in the invention claimed in claim 3, in particular, it is a more remarkable advantage that the spring hinge can be made compact to present a good appearance and to fit well to the slender temple.

This is because necessary strength of the spring member can easily be set up by changing the diameter of the line as the spring member is formed in a line.

(5) In the invention claimed in claim 4, the spring member in the invention claimed in claim 2 is formed in a line, the peculiar effects of which is the same as the invention claimed in claim 1. However, in the invention claimed in claim 4, in particular, it is a more remarkable advantage that the spring hinge can be made compact to present a good appearance and to fit well to the slender temple. This is because necessary strength of the spring member can easily be set up by changing the diameter of the line as the spring member is formed in a line.

(6) In the invention claimed in claim 5, the part of the above mentioned flexibly press portion contacting the above mentioned arc periphery in the invention claimed in claims 1 and 2 is formed to contact by surface with the above mentioned arc periphery, the peculiar effects of which is the same as the invention claimed in claims 1 and 2. However, in the invention claimed in claim 5, in particular, there is an advantage that simplification of assembly can be attained and durability of the spring hinge can be improved further, because the curving surface contacting the arc periphery is formed at the flexible press portion.

Namely, in an occasion that the spring hinge related to the invention is constituted, when the intermediate connecting member is inserted between the upper and lower connecting members while fitting each of the holes of these members coaxially, and a pivot axis is pierce through these holes to connect the three connecting members, it can be prevented that the flexible press portion and the arc periphery of the intermediate connecting member slip one another, by which insertion of the intermediate connecting member between the upper and lower connecting members and the connection of the three connecting members by a pivot shaft can be simplified. Further, because of the contact by surface with the curving surface, wear of the intermediate connecting member and the spring member can be decreased in comparison to the state of contact at a point, wherefore there is an advantage that durability of the spring hinge can be improved substantially.

Other advantages of this invention will be apparent from the description of the embodiments with reference to the drawings.

BRIEF DESCRIPTION OF THE DRAWINGS

The drawings show embodiments of a spring hinge for eyeglasses according to this invention in which.

DETAILED DESCRIPTION OF THE PREFERRED EMBODIMENTS

First Embodiment

Figure 1:
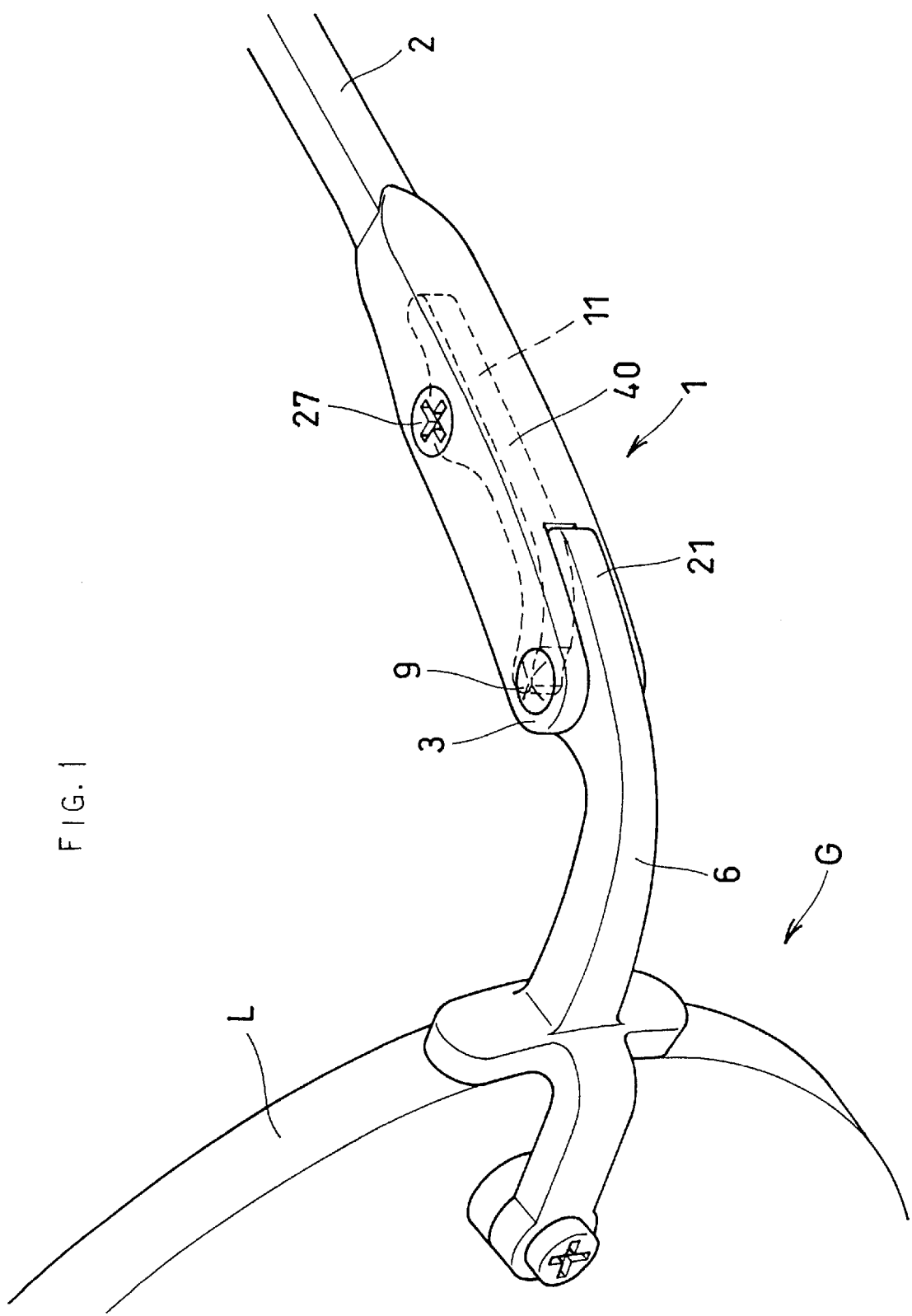
FIG. 1 is a perspective view of the spring hinge of this invention seen from the outside.

In FIG. 1, a spring hinge 1 according to this invention is utilized for comprising rimless eyeglasses G, in which a temple 2 is directly connected to a lens L, and so it is called "two point".

Figure 6:
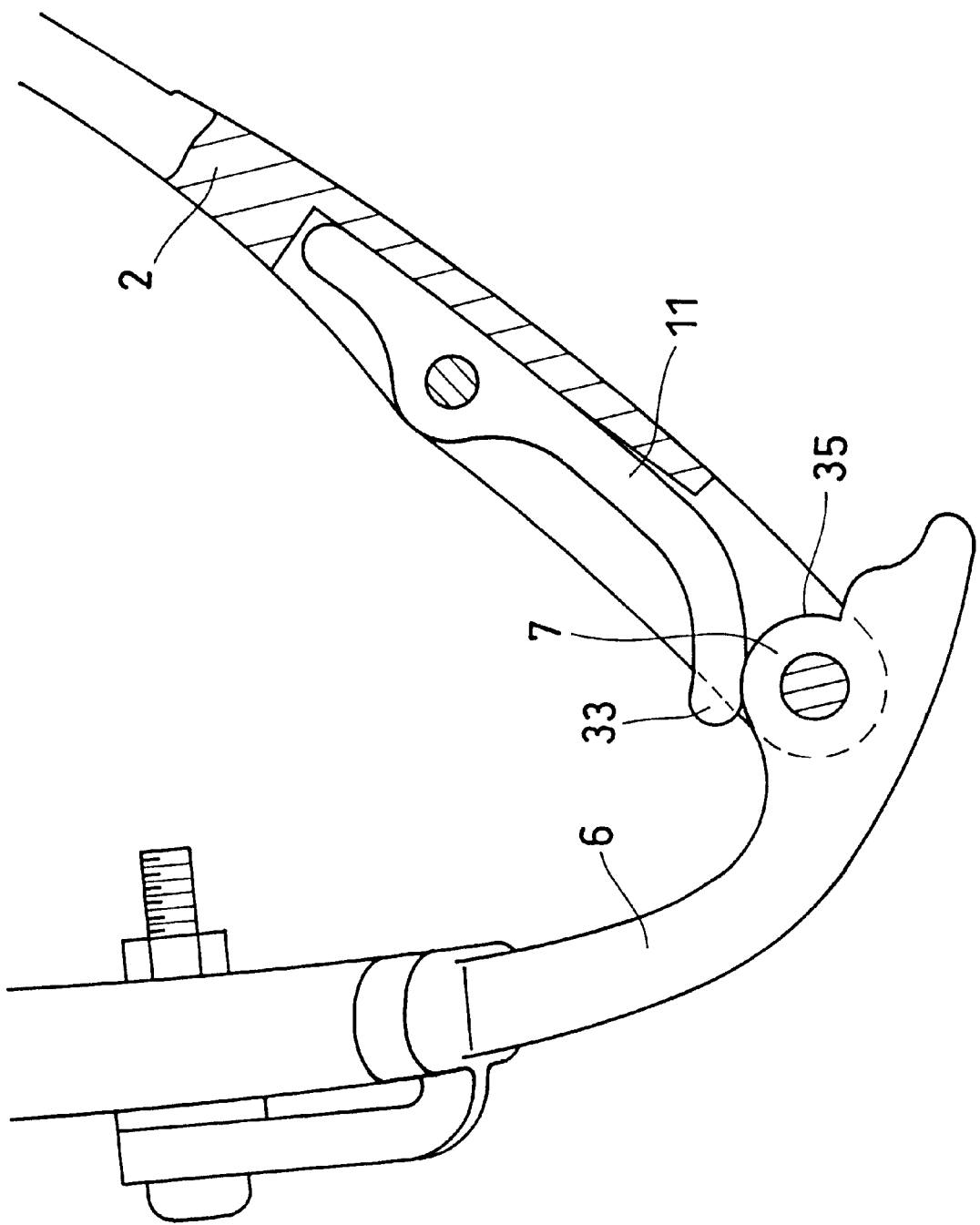
FIG. 6 is a plan view showing a state that the temple is on the way of folding, partially broken away.
Figure 7:
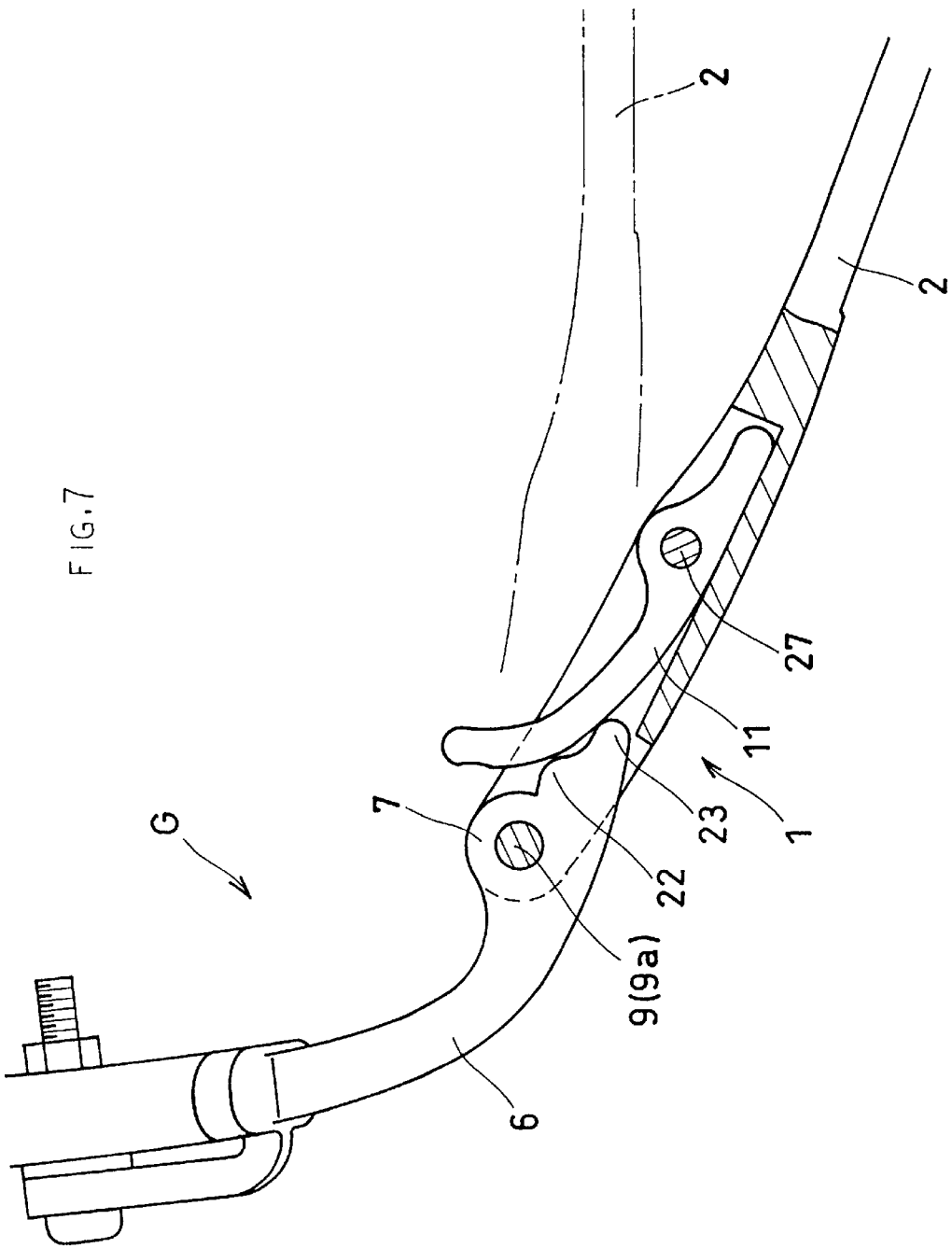
FIG. 7 is a plan view showing a state that the temple is opened outwardly against an urged action of a spring member, partially broken away.

Its whole construction will be described with reference to FIGS. 1 to 6. At a front portion of the temple 2, an intermediate connecting member 7 is inserted between upper and lower connecting members 3 and 5, which are provided in a state of facing each other leaving a predetermined distance in up and down directions. The intermediate connecting member 7 is, for example, provided at a rear portion of an armor 6 which is bent in the form of an L-letter. The connecting members 3, 5 and 7 are connected to one another by a pivot shaft 9 (FIG. 3) as a caulking pin 9a by which an tip end portion 8 is caulked as shown in FIG. 4. As a result, the temple 2 is so composed to be foldable so as to overlap an eyeglass front 10 as shown by an alternate long and short dash line in FIG. 5, from a state of unfolded state of FIG. 5 in which the temple is projecting rearwardly of the eyeglasses. Further, the temple 2 can be opened and closed with a suitable hardness by an urged action of a spring member 11 which is assembled, and the temple 2 in the unfolded state is also composed to be able to open outwardly at a predetermined angle against an urged action of the spring 11, as shown in FIG. 7.

Figure 2:
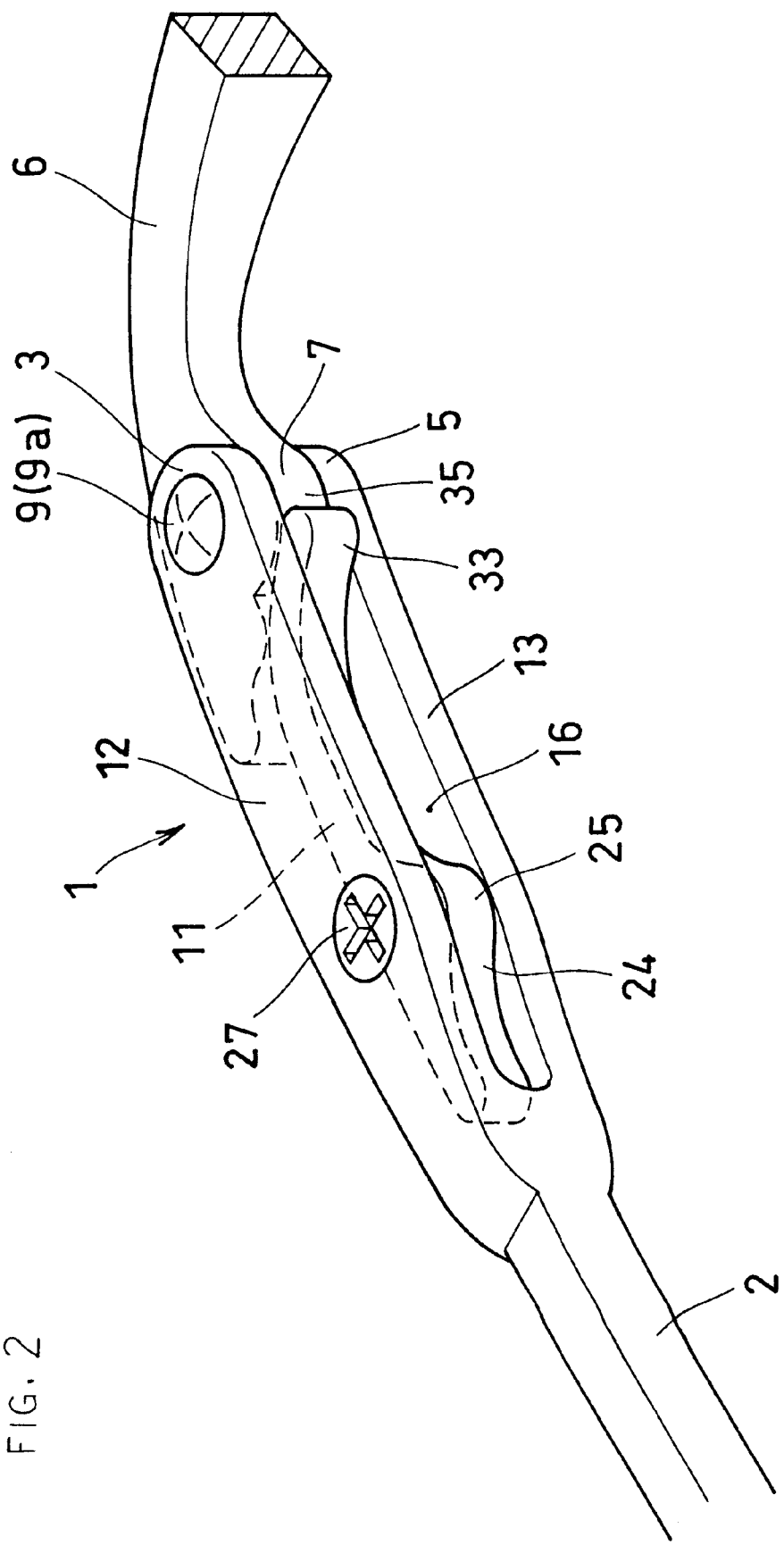
FIG. 2 is a perspective view of the spring hinge of this invention seen from the inside.
Figure 3:
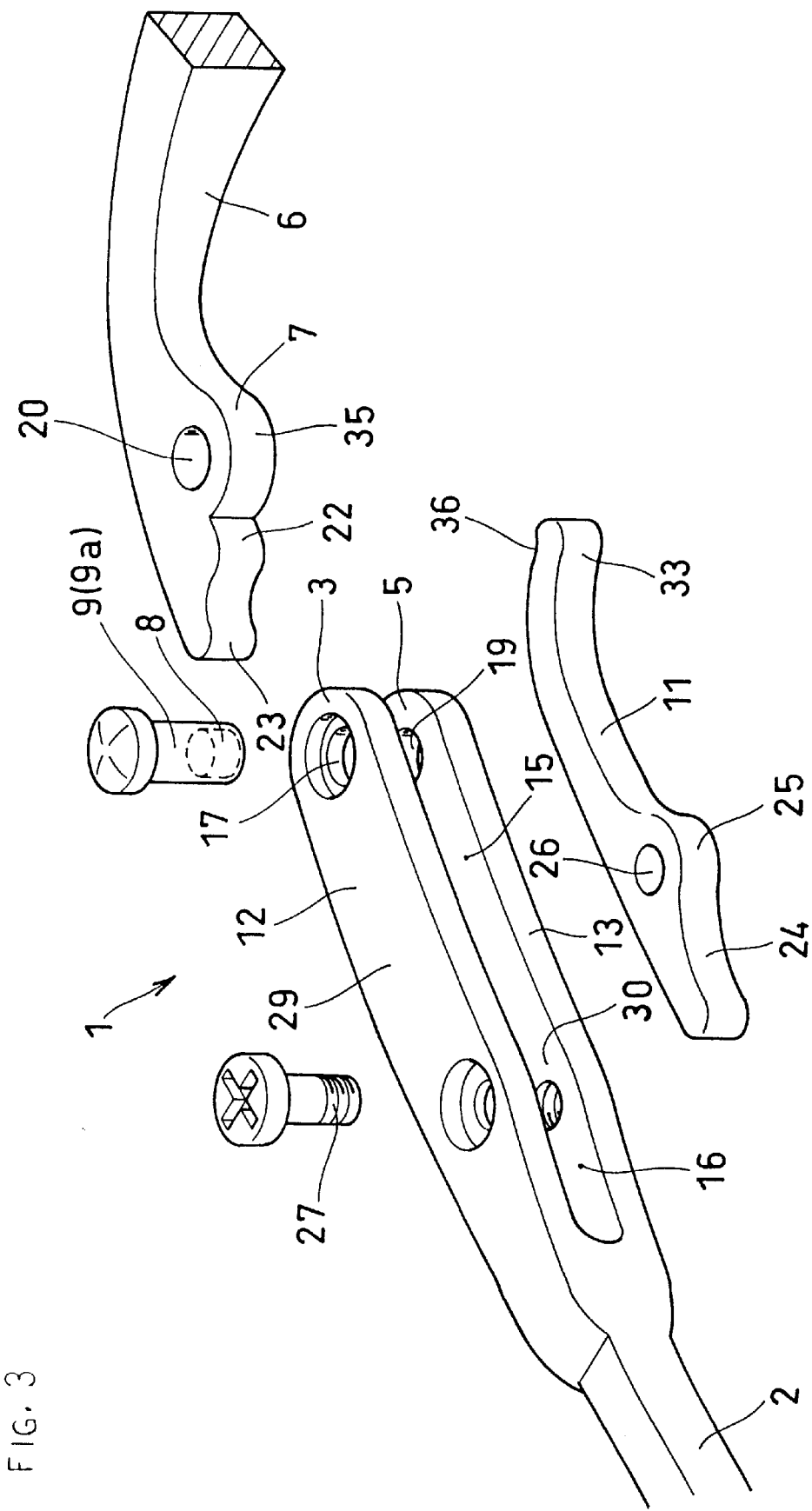
FIG. 3 is a perspective view of the spring hinge of this invention disassembled.
Figure 4:
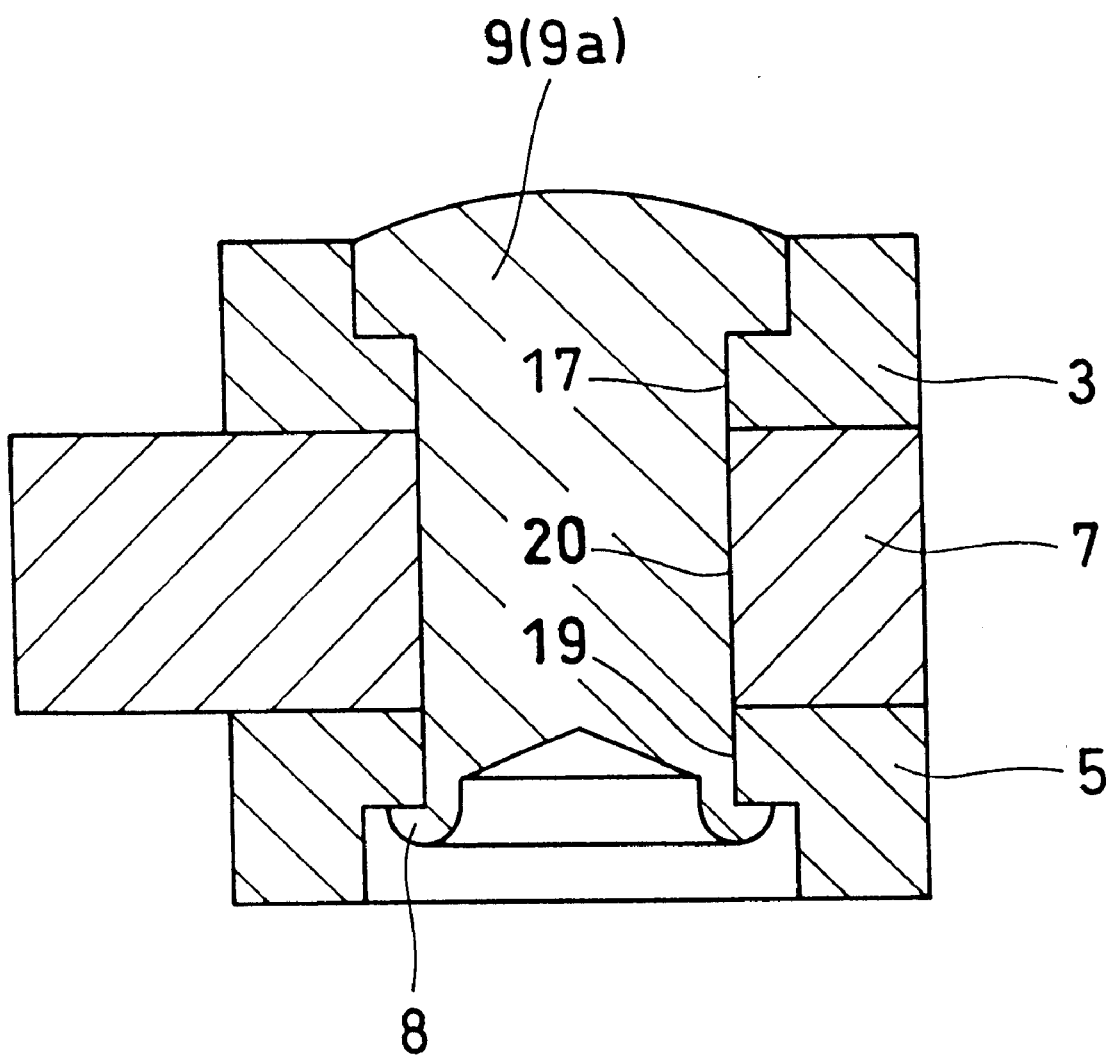
FIG. 4 is a sectional view showing a state that upper and lower connecting members and an intermediate connecting member are caulked and pivoted by a pin.
Figure 5:
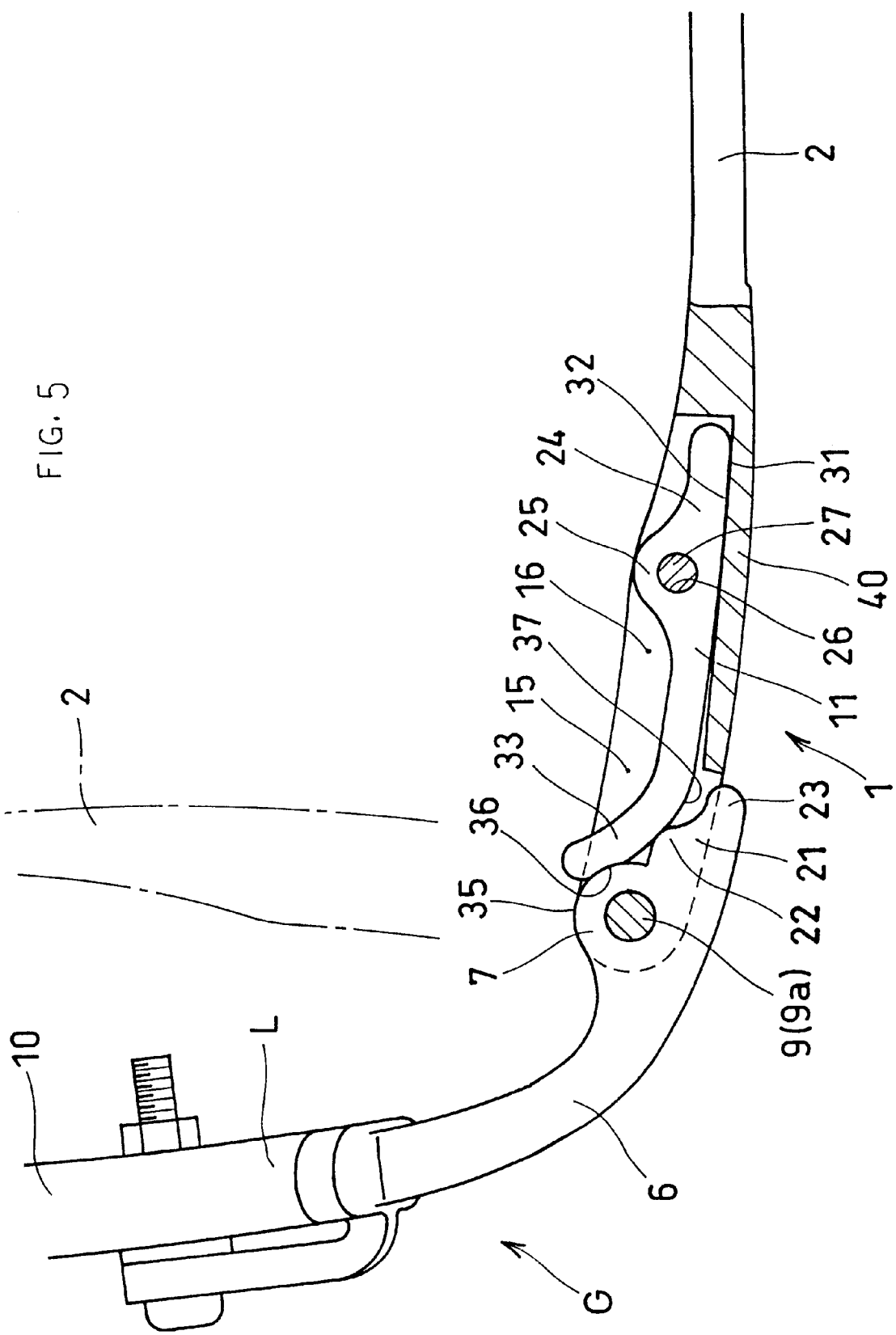
FIG. 5 is a plan view showing an unfolded state of a temple, partially broken away.

As shown in FIGS. 2 and 3 and FIG. 5, the more specific construction of the temple 2, is such that its front side portion comprises projections 12 and 13 which are opposed in up and down direction, and a free groove 15 is formed between the projections. A long concave groove 16, which is opened inwardly and long in forward and rearward directions, is provided rearwardly of the up and down projections 12 and 13. The forward ends of the upper and lower projections 12 and 13 are formed to be the connecting members 3 and 5, and shaft holes 17 and 19 (FIGS. 3 and 4) are coaxially formed with the connecting members 3 and 5.

The intermediate connecting member 7 is projecting in the inside of the rear portion of the armor 6, and a shaft hole 20 is formed with the connecting member 7 to fit the shaft holes 17 and 19. The temple 2 is foldable by inserting the pivot shaft 9 into the shaft holes 17, 19 and 20 which are fit to one another. In a state that the temple 2 is unfolded, a rear portion 21 of the armor is fit into the open groove 15 of the temple from the outside thereof, as shown in FIGS. 1 and 5.

In the inside of the armor 6, there is provided a control projection 22 which is positioned rearwardly of the intermediate connecting member 7, and a press projection 23 is also provided rearwardly of the control projection 22, as shown in FIGS. 3 and 5.

The spring 11 is composed such that a line material such as β-titanium having flexibility is cut into a predetermined length and given necessary treatment. An inserting portion 24 of the spring 11, which is fit into the long concave groove 16, provides an attaching portion 25 at a portion adjacent to its rear end. The spring 11 is fixed to upper and lower groove walls 29 and 30 of the long concave groove 16 by a screw 27 which is inserted into an insertion hole 26 which penetrates the attaching portion 25. An outer surface 31 of the inserting portion 24 contacts a bottom surface 32 of the long concave groove 16, as shown in FIG. 5, so that rotation of the spring 11 is prevented about an axis of the screw 27. As shown in FIGS. 2 and 5, a flexible press portion 33 forming a front portion of the spring 11, which is slightly bent inwardly, presses flexibly an arc periphery 35 of the intermediate connecting member 7, from the inside of the armor. The arc periphery is formed about a center of the shaft hole 20 or a center of the shaft 9. In this embodiment, a portion of the flexible press portion 33, which contacts the arc periphery 5, is formed to be a curved surface 36 which contacts the arc periphery by face to face contact.

As shown in FIG. 5, the temple 2 of unfolded state projecting rearwardly of the eyeglasses, keeps its unfolded state by contacting the control projection 22 of the armor 6 with an outer surface 37 of the front portion of the spring. The temple 2 of unfolded state is foldable with necessary frictional force while keeping flexible pressing state, as shown with an alternate long and short dash line in FIG. 5, and therefore the temple 2 may be opened and closed with constant hardness. FIG. 6 shows a state that the temple is on the way of folding.

As shown in FIG. 7, the temple 2 of unfolded state may be flexibly opened outwardly at a predetermined angle against an urged action of the spring 11. In the beginning of its opening, the control projection 22 presses the spring 11 inwardly so as to flexibly deform or transform the spring 11. FIG. 5 shows a state that the spring is just in a position prior to pressing. Thereafter, as shown in FIG. 7, the spring 11 is pressed inwardly so as to flexibly deform or transform the spring 11 with cooperative function of the control projection and the press projection 23 or the press projection 23 only.

Figure 8:
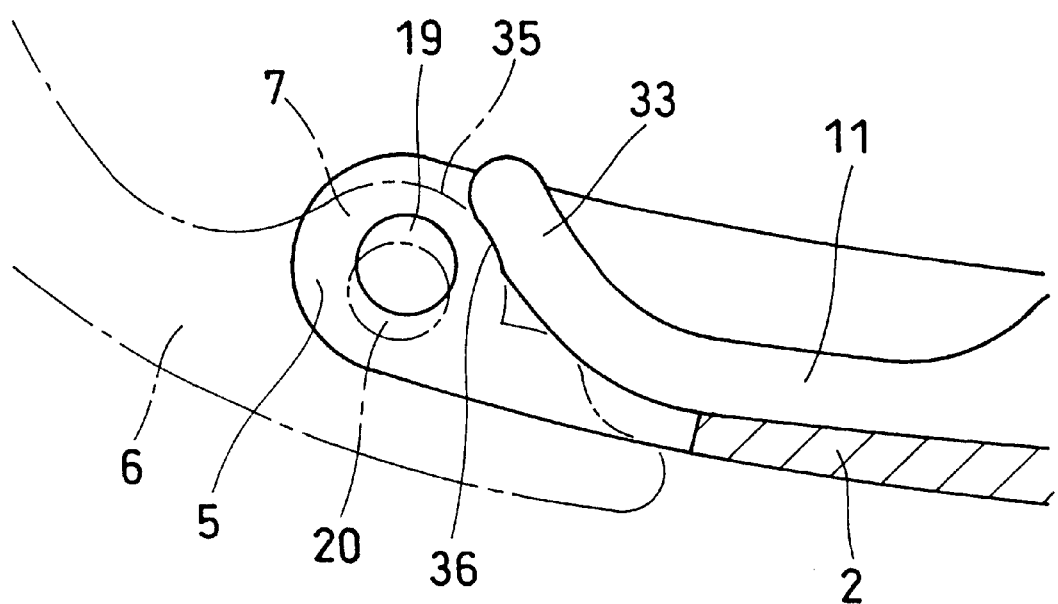
FIG. 8 is a sectional view for describing a manner of insertion of the intermediate connecting member to the upper and lower connecting members.

The spring hinge 1 of the above mentioned construction, is composed as follows, as shown in FIGS. 2 and 5. The intermediate connecting member 7, provided on the side of the armor, is inserted between the upper and lower connecting members 3 and 5 which are provided on the side of the temple, and the shaft holes 17, 19 and 20 are fift coaxially so that the pivot shaft 9 may be inserted thereinto so as to connect the connecting members 3, 5 and 7 together. At the time, since the flexible press portion 33 in free state becomes in a state that it is positioned between the upper and lower connecting members 3 and 5, as shown in FIG. 8, the shaft hole 20 of the connecting member 7 is not fit coaxially to the shaft holes 17 and 19 only by inserting the intermediate connecting member 7 into the upper and lower connecting members 3 and 5. Therefore, it is necessary that the intermediate connecting member 7 is assembled with the upper and lower connecting members 3 and 5 in such a state of placing the flexible press portion 33 of the spring 11 that it is flexibly pressed inwardly. In this embodiment, as mentioned above, since the curved surface 36, which contacts the arc periphery 35 of the intermediate connecting member with face to face contact, is formed with the flexible press portion 33 of the spring 11, the curved surface 36 prevents the flexible press portion 33 and the arc periphery 35 from slipping each other when the shaft holes 17, 19 and 20 are fit coaxially by assembling the up and down connecting members 3 and 5 and the intermediate connecting member 7. Thereby, it becomes possible to easily insert the intermediate connecting member 7 into the upper and lower connecting members 3 and 5 and also connect the three members by means of the pivot shaft 9.

In this eyeglasses having the spring hinge 1, when the temple 2 is opened outwardly as shown in FIG. 6, spring function acts inwardly with the urged action of the spring 11, so that the temple 2 may fit on a temporal of the head.

It becomes possible to obtain a suitable urging force corresponding to a thickness of the temple by setting a thickness of the spring 11 desirably.

Second Embodiment

Figure 9:
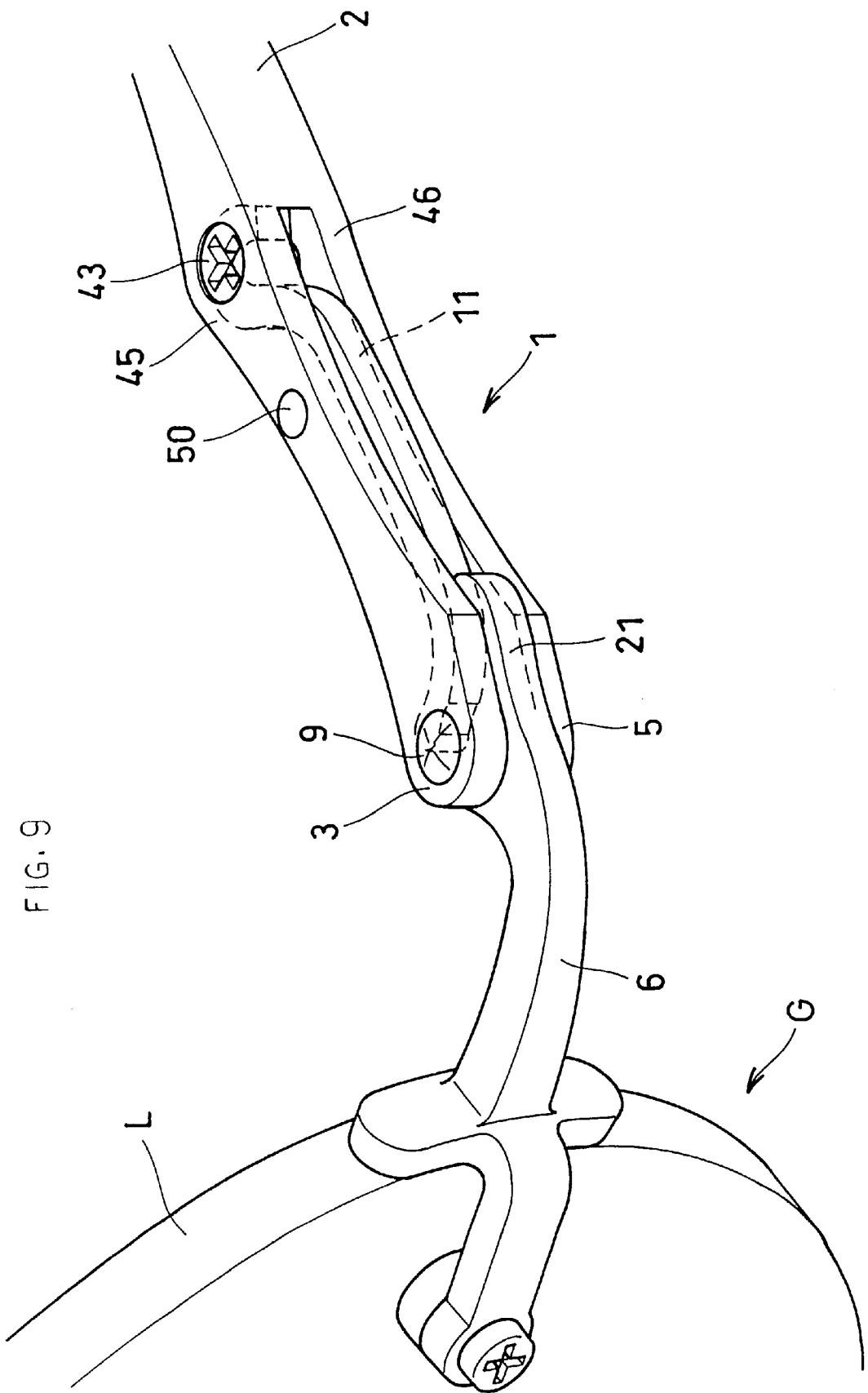
FIG. 9 is a perspective view of the spring hinge seen from the outside.

FIG. 9 shows another aspect of the spring hinge 1, which is provided on the side of the temple, in eyeglasses G similar to one which is referred to in the first embodiment.

Figure 13:
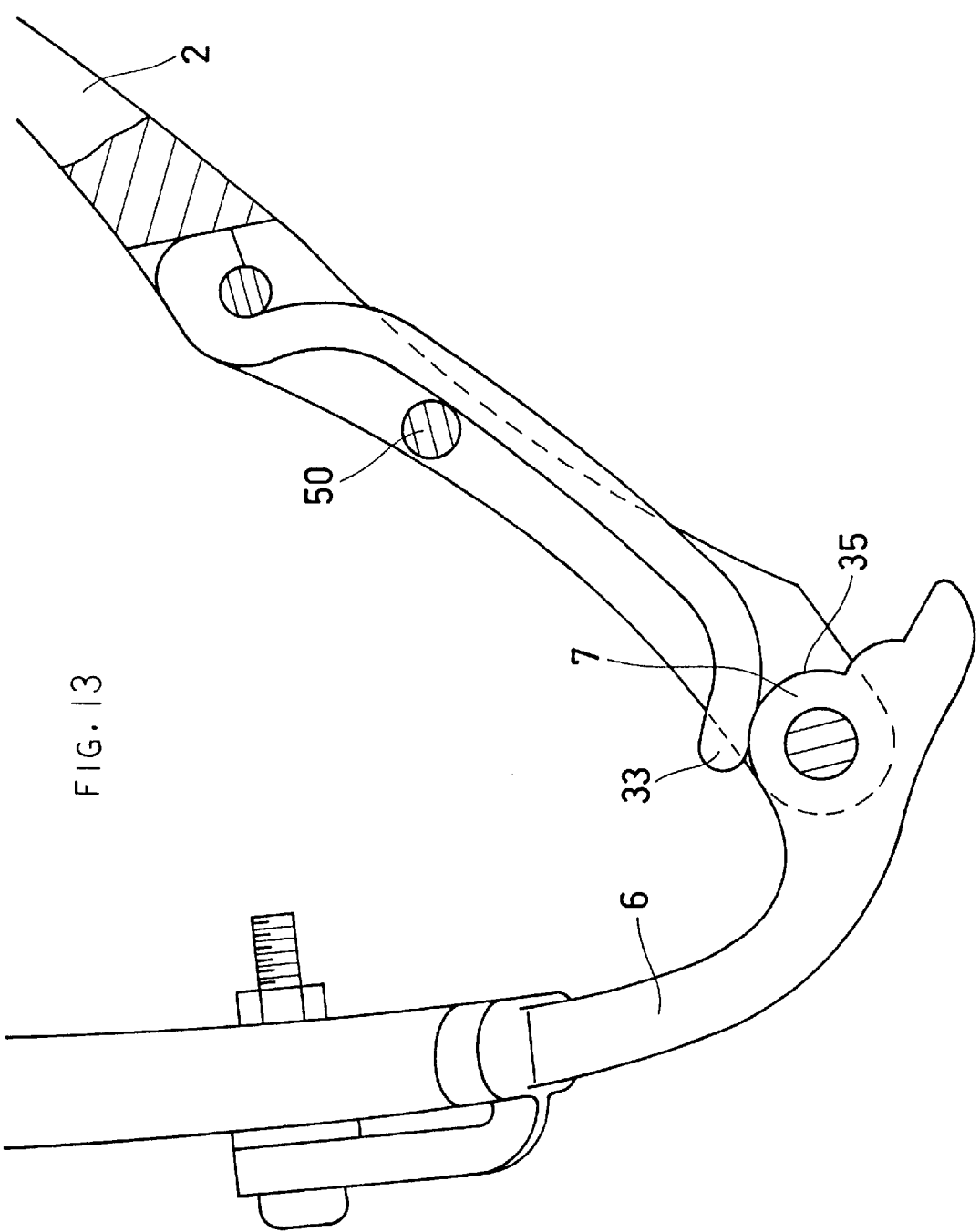
FIG. 13 is a plan view showing a state that the temple is on the way of folding, partially broken away.
Figure 14:
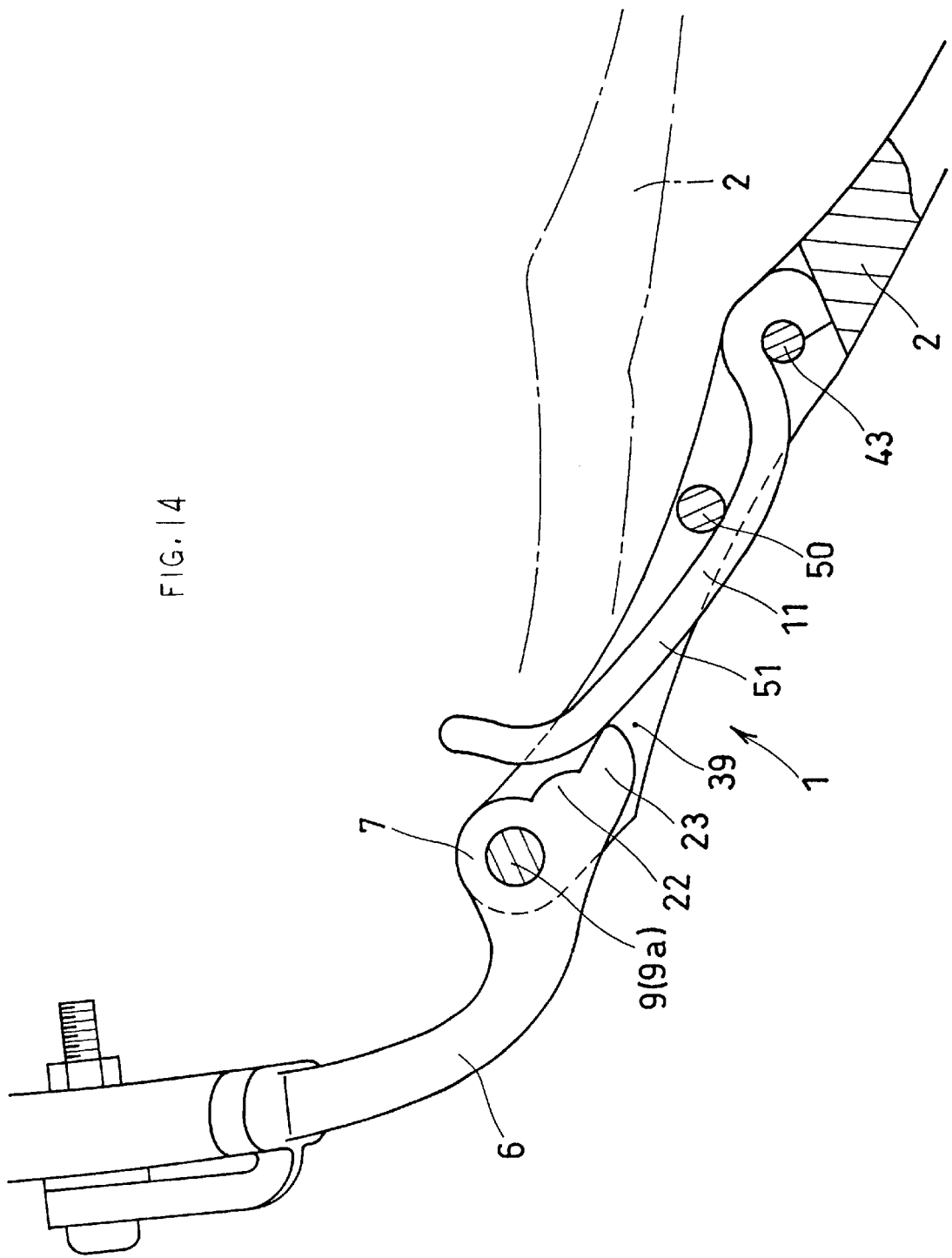
FIG. 14 is a plan view, partially broken away, showing a state that the unfolded temple is opened outwardly at a predetermined angle against an urged action of a spring member.
Figure 15:
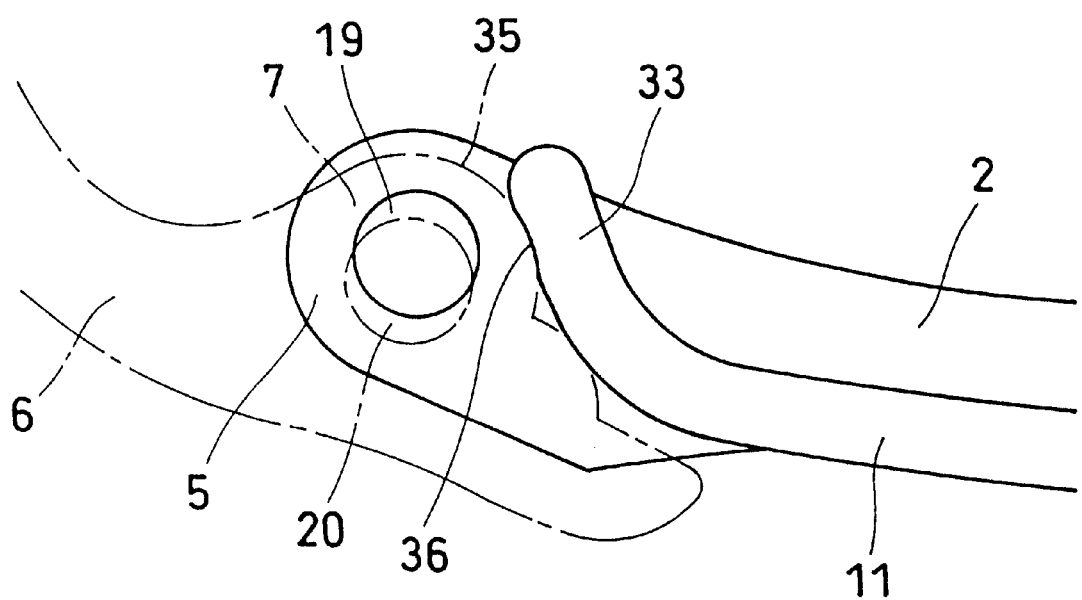
FIG. 15 is a sectional view for describing a manner of insertion of the intermediate connecting member to the upper and lower connecting members.

Whole construction of the spring hinge 1 will be described with reference to FIGS. 9 through 14. At a front portion of the temple 2, an intermediate connecting member 7 is inserted between upper and lower connecting members 3 and 5, which are provided in a state of facing each other leaving a predetermined distance in up and down directions. The intermediate connecting member 7 is, for example, provided at a rear portion of an armor 6 which is bent in the form of an L-letter. The connecting members 3, 5 and 7 are connected to one another by a pivot shaft 9 (FIG. 11) as a caulking pin 9a by which an tip end portion 8 is caulked as shown in FIG. 4. As a result, the temple 2 is so composed to be foldable so as to overlap an eyeglass front 10 as shown by an alternate long and short dash line in FIG. 12, from a state of unfolded state of FIG. 5 in which the temple is projecting rearwardly of the eyeglasses. Further, the temple 2 can be opened and closed with a suitable hardness by an urged action of a spring member 11 which is assembled, and the temple 2 in the unfolded state is also composed to be able to open outwardly at a predetermined angle against an urged action of the spring 11, as shown in FIG. 14.

Figure 10:
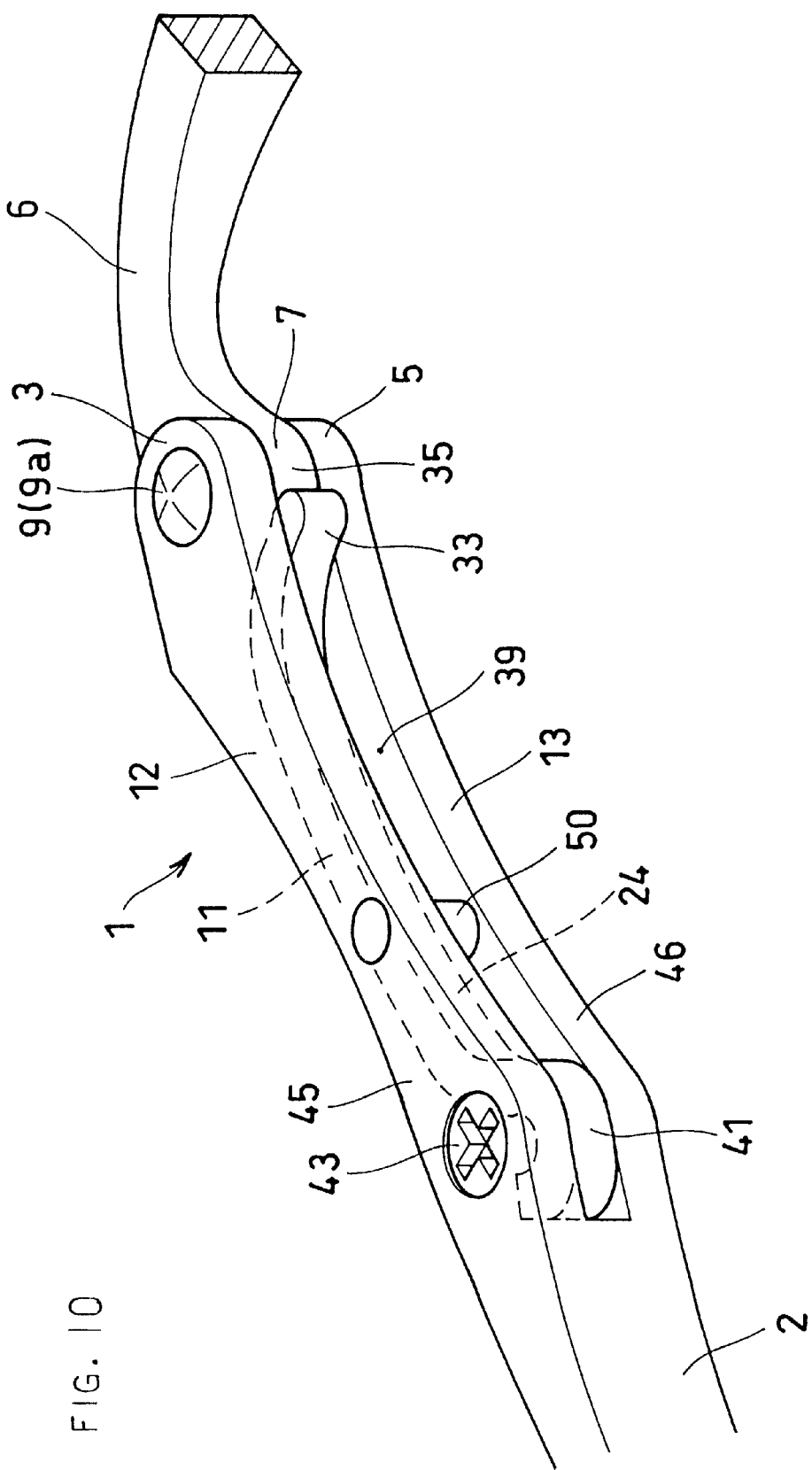
FIG. 10 is a perspective view of the spring hinge seen from the inside.
Figure 11:
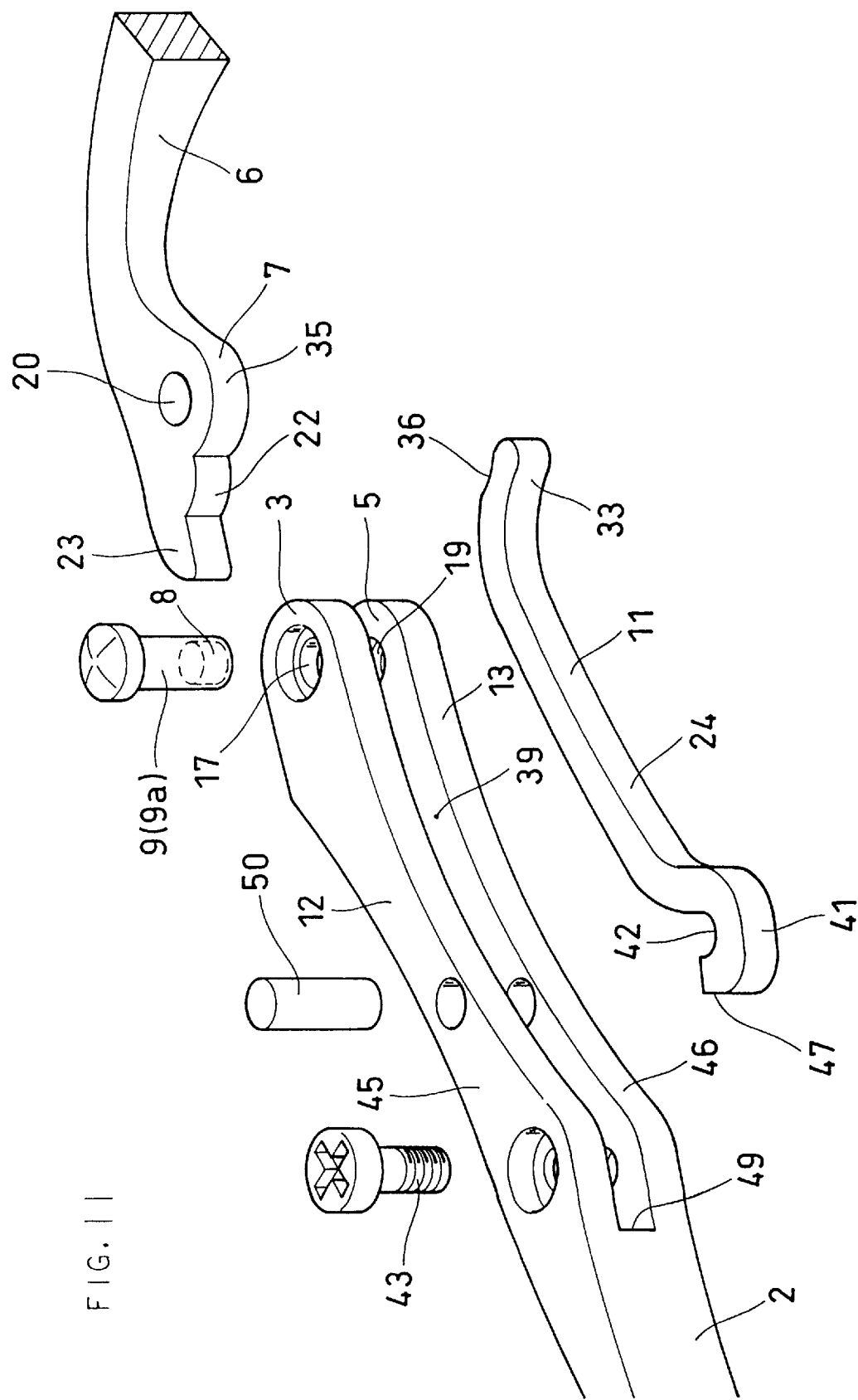
FIG. 11 is a perspective view of the spring hinge disassembled.
Figure 12:
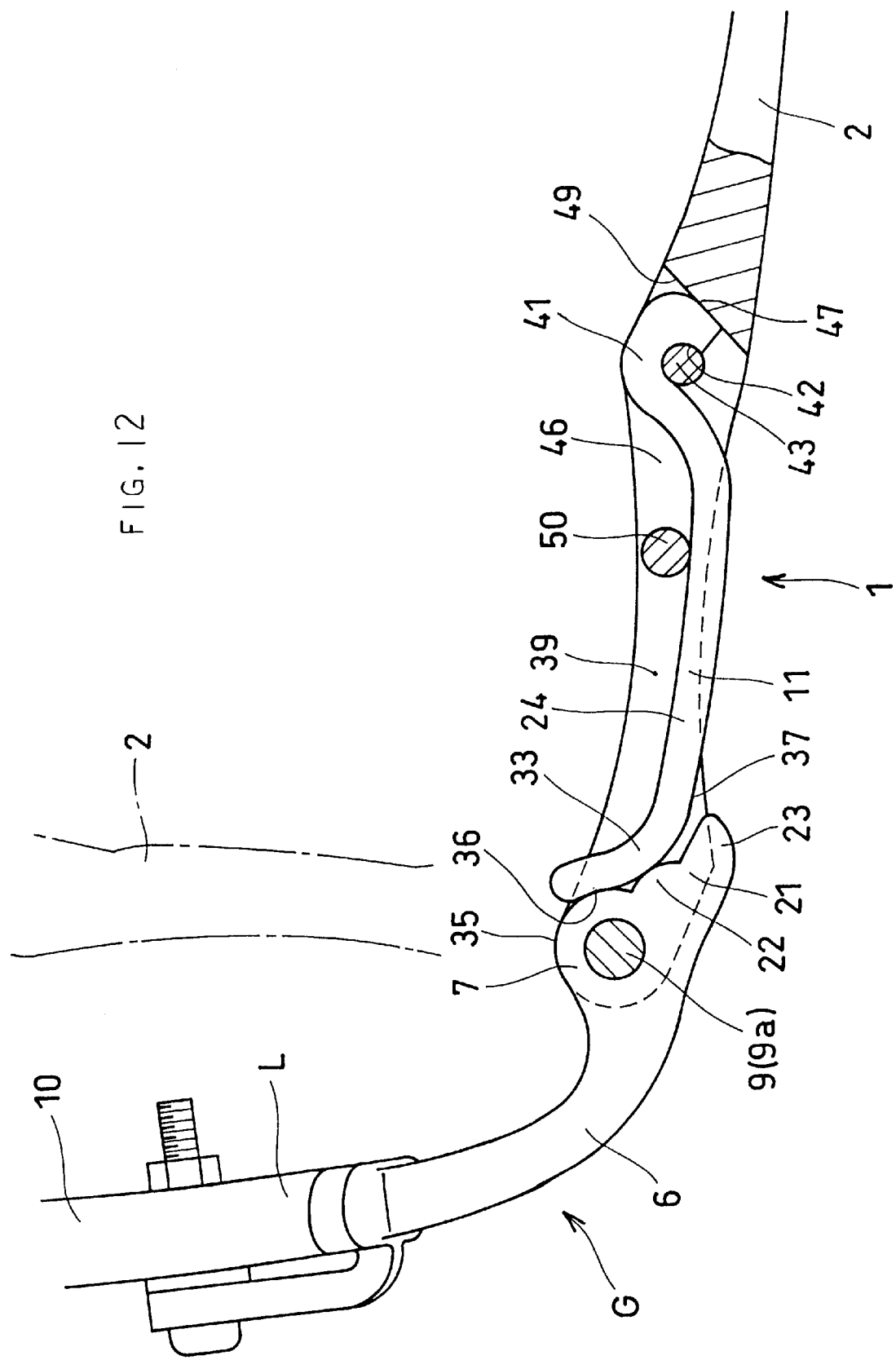
FIG. 12 is a plan view of the unfolded state of the temple, partially broken away.

As shown in FIGS. 10 through 12, the more specific construction of the temple 2, is such that its front side portion comprises projections 12 and 13 which are opposed in up and down direction, and a free groove 39 is formed between the projections. In comparison with the spring hinge of the first embodiment, it provide a construction that a bottom surface 40 of the long concave groove 16 is cut off (FIGS. 1 and 5), and therefore the lengthes of up and down projections 12 and 13 are longer than those of the first embodiment.

The forward ends of the up and down projections 12 and 13 are formed to be the connecting members 3 and 5, and shaft holes 17 and 19 (FIG. 11) are coaxially formed with the connecting members 3 and 5. The intermediate connecting member 7 is projecting in the inside of the rear portion of the armor 6, and a shaft hole 20 is formed with the connecting member 7 to fit the shaft holes 17 and 19. The temple 2 is foldable by inserting the pivot shaft 9 into the shaft holes 17, 19 and 20 which are fit to one another. In a state that the temple 2 is unfolded, a rear portion 21 of the armor is fit into the open groove 39 of the temple from the outside thereof, as shown in FIGS. 9 and 12.

In the inside of the armor 6, there is provided a control projection 22 which is positioned rearwardly of the intermediate connecting member 7, and a press projection 23 is also provided rearwardly of the control projection 22, as shown in FIGS. 11 and 12.

The spring 11 is composed such that a line material such as β-titanium having flexibility is cut into a predetermined length and given necessary treatment. An inserting portion 24 of the spring 11, which is fit into the long concave groove 39, provides a rear end portion which is formed to be a U-letter bent portion 41, and then the spring 11 is fixed to up and down groove walls 45 and 46 of the open groove 39 by means of a screw 43 which is inserted into a semi-circular hole 42 of the U-letter bent portion. And, the spring 11 is prevented from rotating about an axis of the screw 43 by engaging a rear end surface 47 of the U-letter bent portion 41 with a groove bottom 49 of the open groove. As shown in FIGS. 10 and 12, a flexible press portion 33 forming a front portion of the spring 11, which is slightly bent inwardly, presses flexibly an arc periphery 35 of the intermediate connecting member 7, from the inside of the armor. The arc periphery is formed about a center of the shaft hole 20 or a center of the shaft 9. In this embodiment, a portion of the flexible press portion 33, which contacts the arc periphery 5, is formed to be a curved surface 36 which contacts the arc periphery by face to face contact.

As shown in FIG. 12, the temple 2 of unfolded state projecting rearwardly of the eyeglasses, keeps its unfolded state by contacting the control projection 22 of the armor 6 with an outer surface 37 of the front portion of the spring. The temple 2 of unfolded state is foldable with necessary frictional force while keeping flexible pressing state, as shown with an alternate long and short dash line in FIG. 12, and therefore the temple 2 may be opened and closed with constant hardness. FIG. 13 shows a state that the temple is on the way of folding.

As shown in FIG. 14, the temple 2 of unfolded state may be flexibly opened outwardly at a predetermined angle against an urged action of the spring 11. In the beginning of its opening, the control projection 22 presses the spring 11 inwardly so as to flexibly deform the spring 11. FIG. 12 shows a state that the spring is just in a position prior to pressing. Thereafter, as shown in FIG. 14, the spring 11 is pressed inwardly so as to flexibly deform or transform the spring 11 with cooperative function of the control projection and the press projection 23 or the press projection 23 only.

The spring hinge 1 of the above mentioned construction, is composed as follows, as shown in FIGS. 10 and 12. The intermediate connecting member 7, provided on the side of the armor, is inserted between the upper and lower connecting members 3 and 5 which are provided on the side of the temple, and the shaft holes 17, 19 and 20 are fift coaxially so that the pivot shaft 9 may be inserted thereinto so as to connect the connecting members 3, 5 and 7 together. At the time, since the flexible press portion 33 in free state becomes in a state that it is positioned between the upper and lower connecting members 3 and 5, as shown in FIG. 8, the shaft hole 20 of the connecting member 7 is not fit coaxially to the shaft holes 17 and 19 only by inserting the intermediate connecting member 7 into the upper and lower connecting members 3 and 5. Therefore, it is necessary that the intermediate connecting member 7 is assembled with the upper and lower connecting members 3 and 5 in such a state of placing the flexible press portion 33 of the spring 11 that it is flexibly pressed inwardly.

In this embodiment, as mentioned above, since the curved surface 36, which contacts the arc periphery 35 of the intermediate connecting member with face to face contact, is formed with the flexible press portion 33 of the spring 11, the curved surface 36 prevents the flexible press portion 33 and the arc periphery 35 from slipping each other when the shaft holes 17, 19 and 20 are fit coaxially by assembling the upper and lower connecting members 3 and 5 and the intermediate connecting member 7. Thereby, it is the same as the first embodiment that it becomes possible to easily insert the intermediate connecting member 7 into the upper and lower connecting members 3 and 5 and also connect the three members by means of the pivot shaft 9.

In this eyeglasses having the spring hinge 1, when the temple 2 is opened outwardly as shown in FIG. 14, spring function acts inwardly with the urged action of the spring 11, so that the temple 2 may fit on a temporal of the head.

It becomes possible to obtain a suitable urging force corresponding to a thickness of the temple by setting a thickness of the spring 11 desirably.

Where the urging force of the press projection 23 of the control projection 22 is small due to the long length of the spring 11, it is preferable that the inside of the middle portion of the spring 11 may be supported by means of a support pin 50 which is fixed to the up and down groove walls of the open groove 39, as shown in FIGS. 10, 12 and 14, so that it becomes possible to increase the urging force of a relatively short portion 51 (FIG. 14) which is forming front of the spring 11.

Third Embodiment

Figure 16:
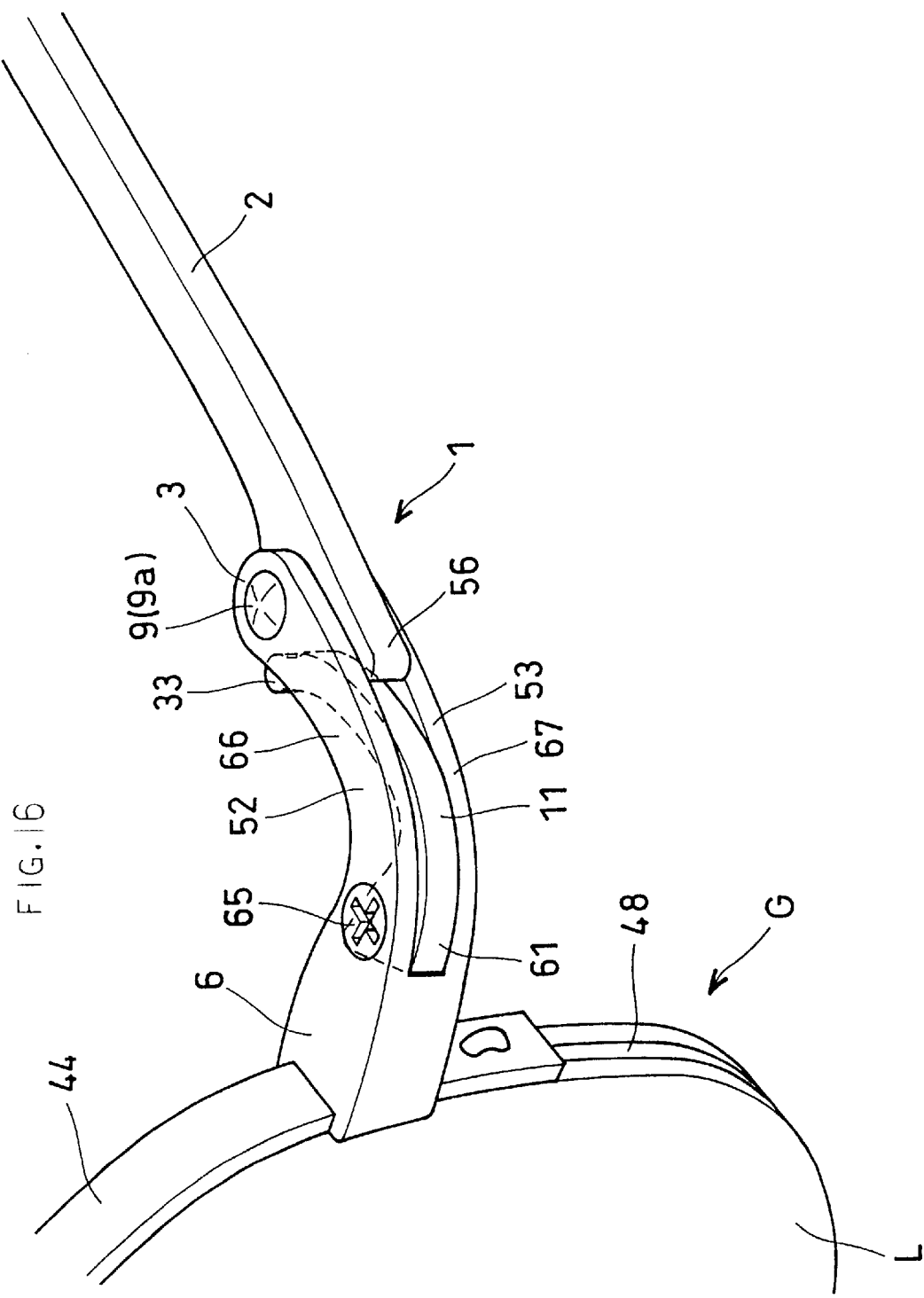
FIG. 16 is a perspective view of the spring hinge of another aspect, seen from the outside.
Figure 17:
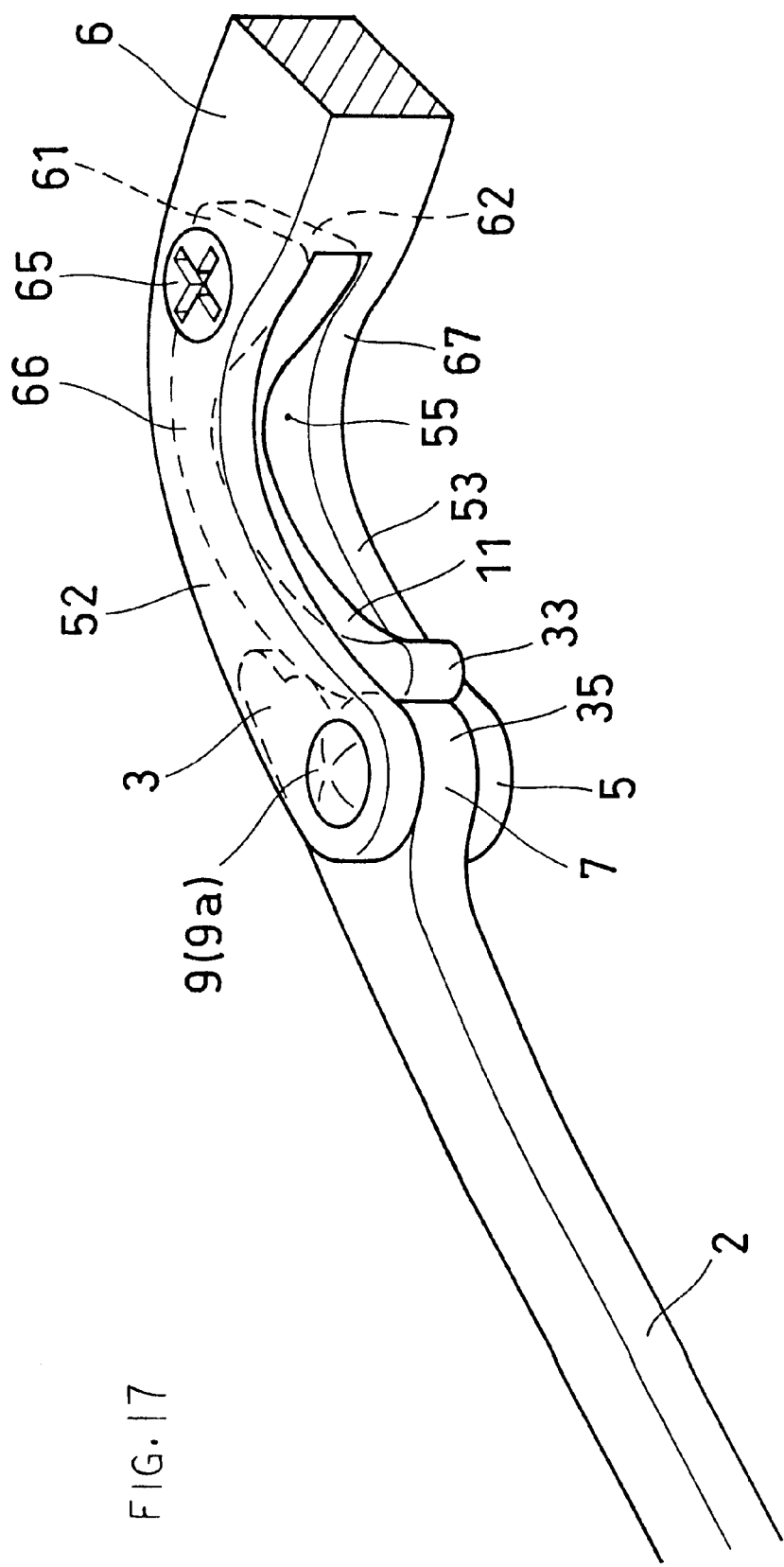
FIG. 17 is a perspective view of the spring hinge of another aspect, seen from the inside.
Figure 20:
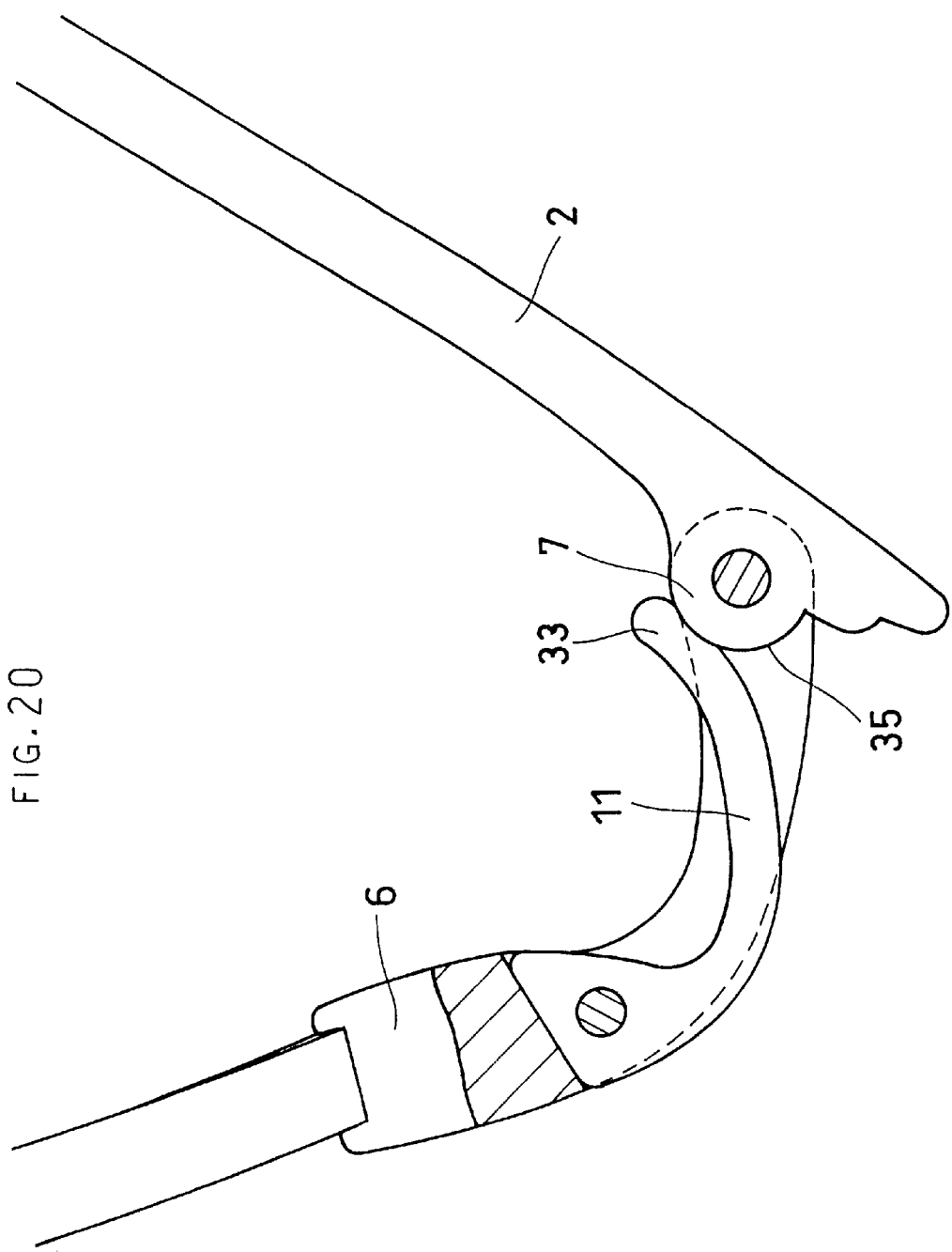
FIG. 20 is a plan view showing a state that the temple is on the way of folding, partially broken away.
Figure 21:
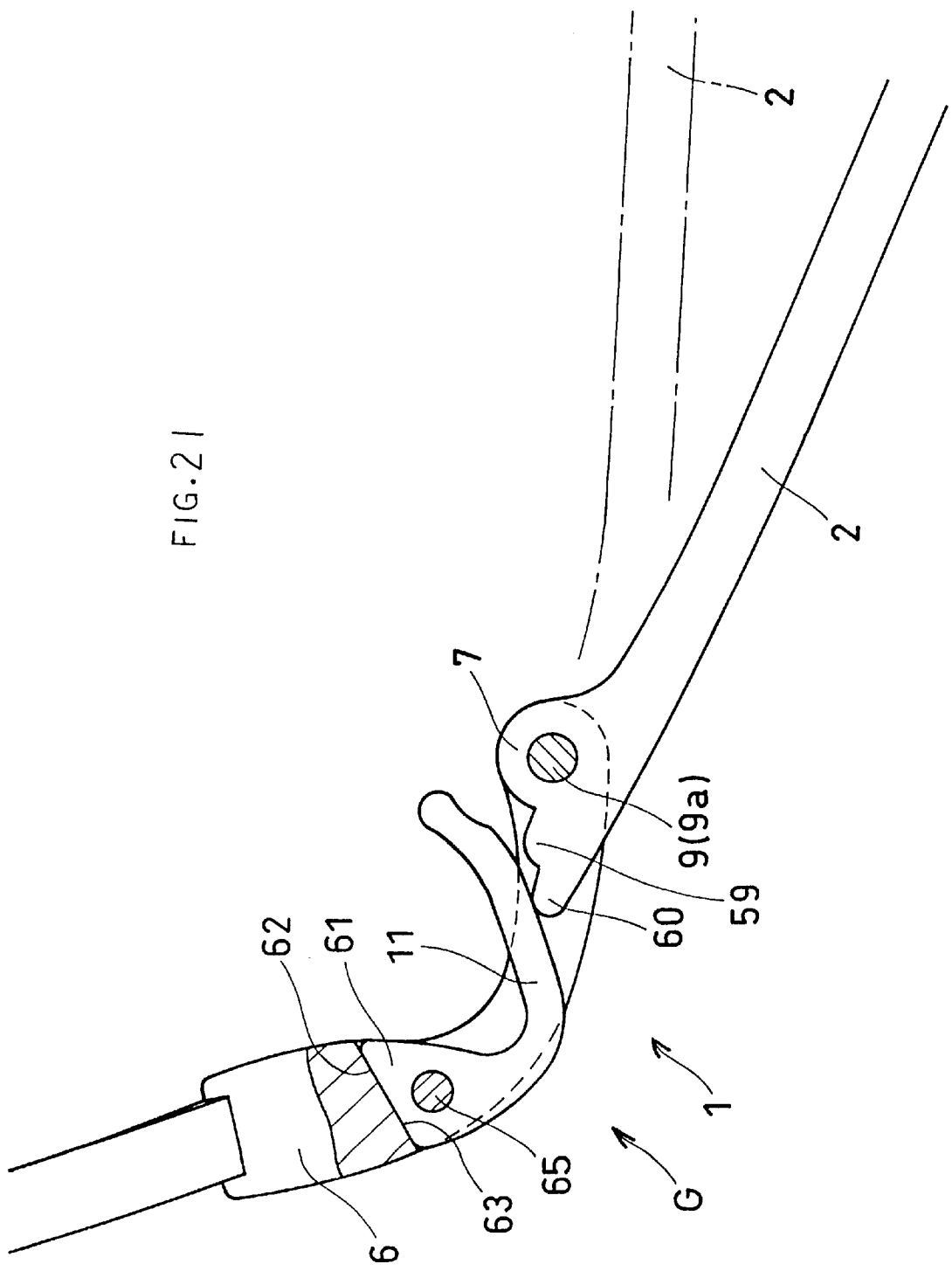
FIG. 21 is a plan view, partially broken away, showing a state that the unfolded temple is opened outwardly against an urged action of a spring member.

FIG. 16 shows another aspect of the spring hinge 1, which is utilized for comprising rimless eyeglasses G, in which a lense L is supported on a curved edge frame 44 by means of a cord 48. Whole construction of the spring hinge 1 will be described with reference to FIGS. 16 through 21. At a rear portion of an armor 6, which is bent, for example, in a L-lette, an intermediate connecting member 7 is inserted between upper and lower connecting members 3 and 5, which are provided in a state of facing each other leaving a predetermined distance in up and down directions. The connecting members 3, 5 and 7 are connected to one another by a pivot shaft 9 (FIG. 18) as a caulking pin 9a which is referred to in the former embodiments. As a result, the temple 2 is so composed to be foldable so as to overlap an eyeglass front 10 as shown by an alternate long and short dash line in FIG. 12, from a state of unfolded state of FIG. 19, in which the temple is projecting rearwardly of the eyeglasses. Further, the temple 2 can be opened and closed with a suitable hardness by an urged action of a spring member 11 which is assembled, and the temple 2 in the unfolded state is also composed to be able to open outwardly at a predetermined angle against an urged action of the spring 11, as shown in FIG. 21.

The more specific construction of the armor 6 is such that its rear portion comprises projections 52 and 53 which are faced in up and down directions, and an opened groove 55 is formed therebetween.

Figure 18:
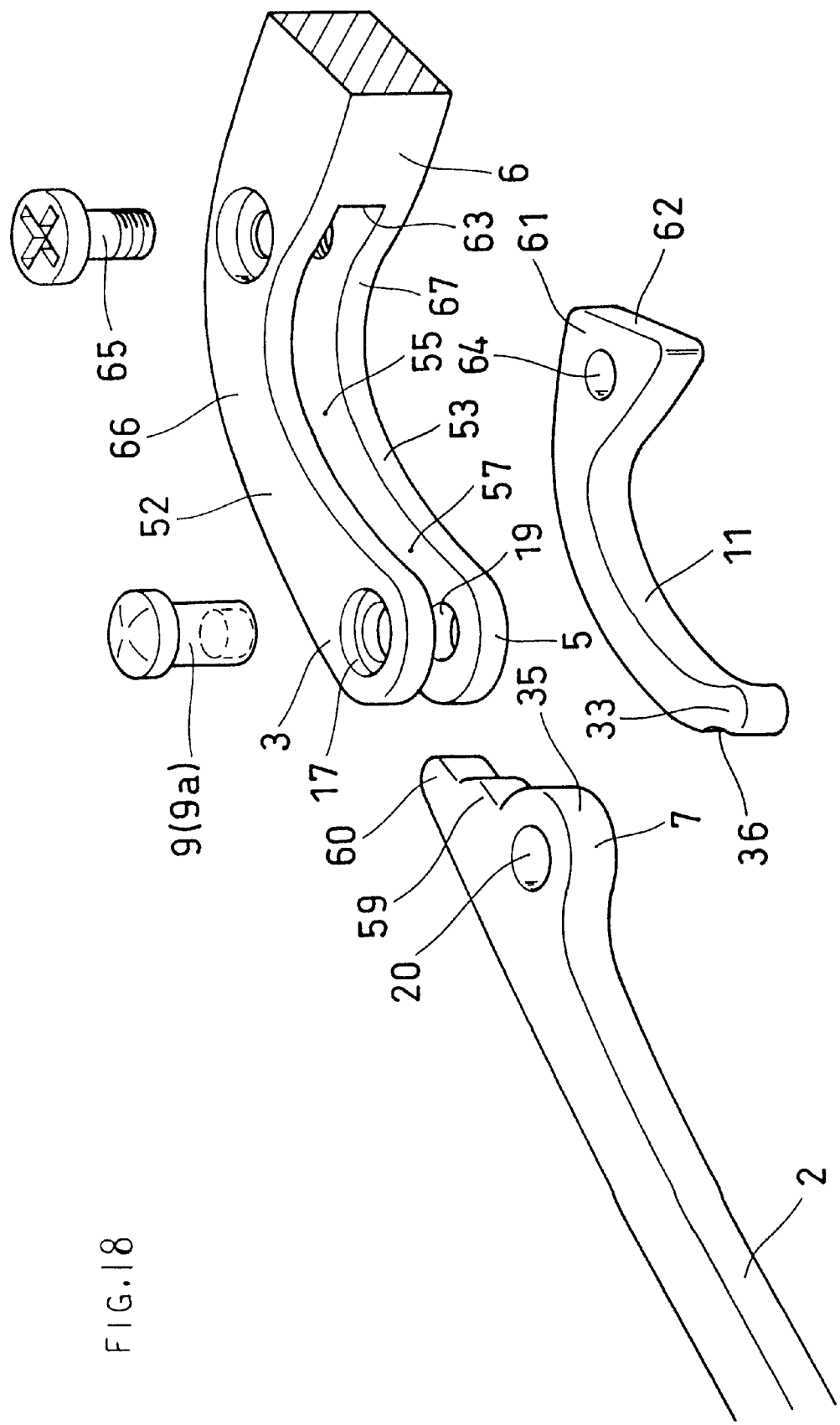
FIG. 18 is a perspective view of the spring hinge of another aspect, disassembled.

And, rear end portions of the upper and lower projections 52 and 53 form connecting members 3 and 5, and then shaft holes 17 and 19 are formed with the connecting members 3 and 5 coaxially (FIG. 18).

Figure 19:
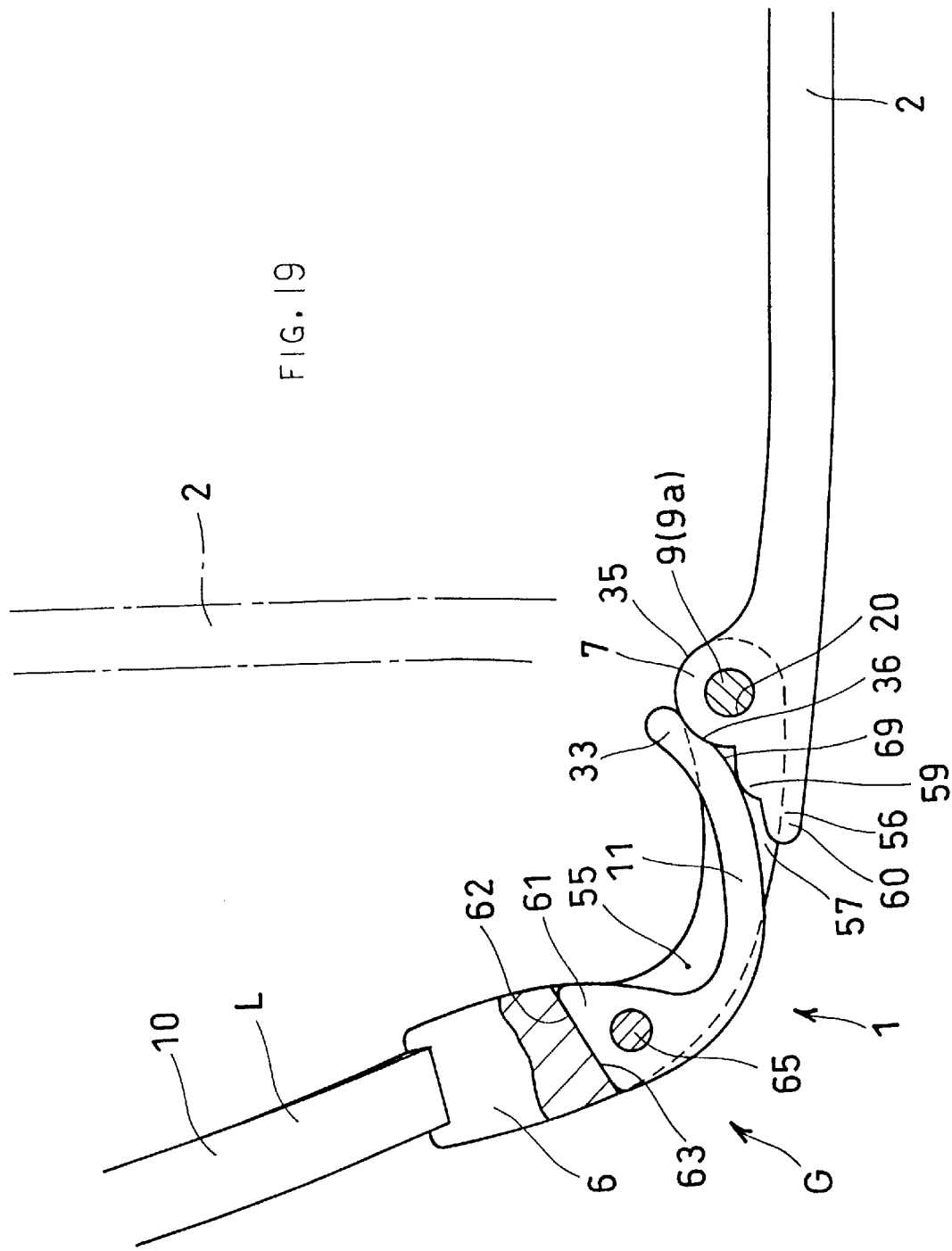
FIG. 19 is a plan view of the unfolded state of the temple, partially broken away.

The inside of the front portion of the temple 2, provides the intermediate connecting member 6 to project and a shaft hole 20 is formed with the connecting member 7 to fit the shaft holes 17 and 19. The temple 2 is foldable by inserting the pivot shaft 9 into the shaft holes 17, 19 and 20, which are positioned to fit one another, and in the unfolded state of the temple 2, a front end portion 56 of the temple is fit into a rear side portion 57 of the open groove 55 which is formed with the armor 6, as shown in FIGS. 16 and 19.

And, the inside of the temple 2 provides a control projection 59 to locate at a front side of the intermediate connecting member 7, and also a press projection 60 is provided with the front of the control projection 59 continuously.

The spring 11 is composed such that a line material such as β-titanium having flexibility is cut into a predetermined length and given necessary treatment so as to form substantially an L-letter, and then installed in the open groove 55. A front end 62 of an expanded portion 61 formed with the spring, is engaged with a groove bottom 63 of the open groove 55 and the spring 11 is prevented from rotating about an axis of a screw 65, in such a manner that the up and down ends of a screw 65, which penetrates an insertion hole 64 of the expanded portion 61, are fixed to upper and lower groove walls 66 and 67.

A flexible press portion 33 of the spring 11, forming a front portion of the spring 11, and slightly bent inwardly, presses flexibly an arc periphery 35 of the intermediate connecting member 7, from the inside of the armor. The arc periphery is formed about a center of the shaft hole 20 or a center of the shaft 9. In this embodiment, a portion of the flexible press portion 33, which contacts the arc periphery 5, is formed to be a curved surface 36 which contacts the arc periphery by face to face contact.

As shown in FIG. 19, the temple 2 of unfolded state projecting rearwardly of the eyeglasses, keeps its unfolded state by contacting the control projection 59 with an outer surface 69 of the rear portion of the spring 11. The temple 2 of unfolded state is foldable with necessary frictional force while keeping flexible pressing state, and therefore the temple 2 may be opened and closed with constant hardness. FIG. 20 shows a state that the temple is on the way of folding.

The temple 2 of unfolded state may be flexibly opened outwardly at a predetermined angle against an urged action of the spring 11. In the beginning of its opening, the control projection 59 presses the spring 11 inwardly so as to flexibly deform the spring 11. Thereafter, as shown in FIG. 19, the spring 11 is pressed inwardly so as to flexibly deform the spring 11 with cooperative function of the control projection 59 and the press projection 60 or by the press projection 60 only.

Figure 22:
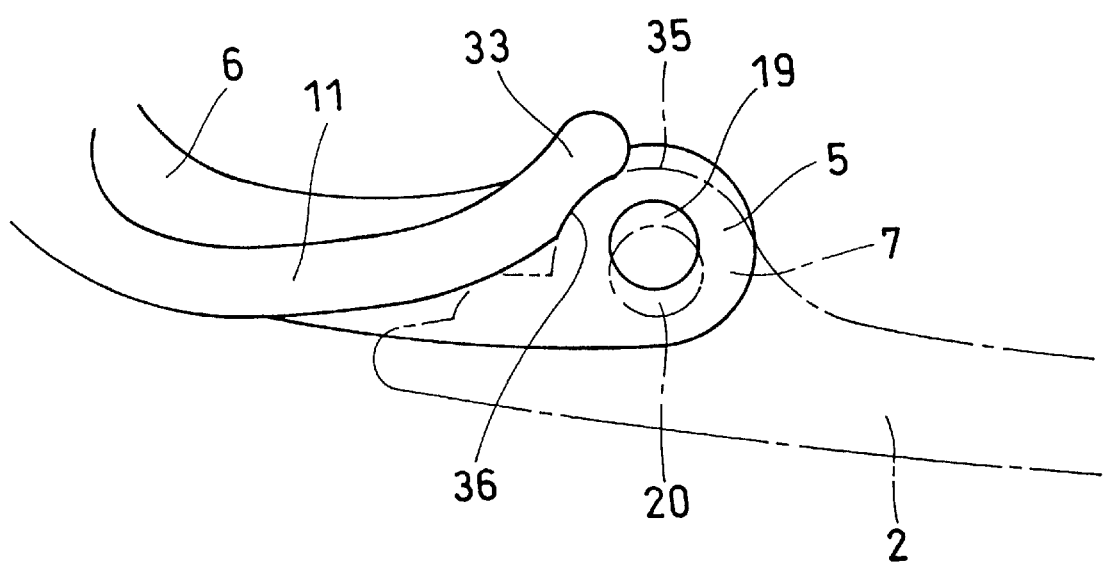
FIG. 22 is a sectional view for describing a manner of insertion of the intermediate connecting member to the upper and lower connecting members.

The spring hinge 1 of the above mentioned construction, is composed as follows. The intermediate connecting member 7, provided on the side of the temple, is inserted between the upper and lower connecting members 3 and 5 which are provided on the side of the armor, and the shaft holes 17, 19 and 20 are fift coaxially so that the pivot shaft 9 may be inserted thereinto so as to connect the connecting members 3, 5 and 7 together. At the time, since the flexible press portion 33 in free state becomes in a state that it is positioned between the upper and lower connecting members 3 and 5, as shown in FIG. 22, the shaft hole 20 of the connecting member 7 is not fit coaxially to the shaft holes 17 and 19 only by inserting the intermediate connecting member 7 into the upper and lower connecting members 3 and 5. Therefore, it is necessary that the intermediate connecting member 7 is assembled with the upper and lower connecting members 3 and 5 in such a state of placing the flexible press portion 33 of the spring 11 that it is flexibly pressed inwardly. In this embodiment, as mentioned above, since the curved surface 36, which contacts the arc periphery 35 of the intermediate connecting member with face to face contact, is formed with the flexible press portion 33 of the spring 11, the curved surface 36 prevents the flexible press portion 33 and the arc periphery 35 from slipping each other when the shaft holes 17, 19 and 20 are fit coaxially by assembling the upper and lower connecting members 3 and 5 and the intermediate connecting member 7. Thereby, it may obtain the same result as the former embodiments that it becomes possible to easily insert the intermediate connecting member 7 into the upper and lower connecting members 3 and 5 and also connect the three members by means of the pivot shaft 9.

In this eyeglasses having the spring hinge 1, when the temple 2 is opened outwardly as shown in FIG. 21, spring function acts inwardly with the urged action of the spring 11, so that the temple 2 may fit on a temporal of the head.

It is possible to obtain a suitable urging force corresponding to a thickness of the temple by setting a thickness of the spring 11 desirably.

Other Embodiments

Figure 23:
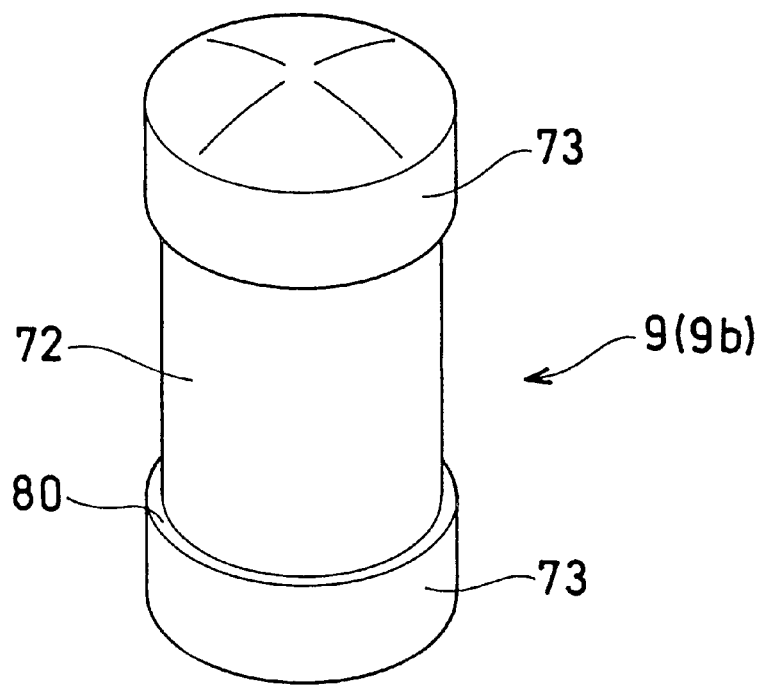
FIG. 23 is a perspective view a pivot shaft comprising a pin having a head.
Figure 27:
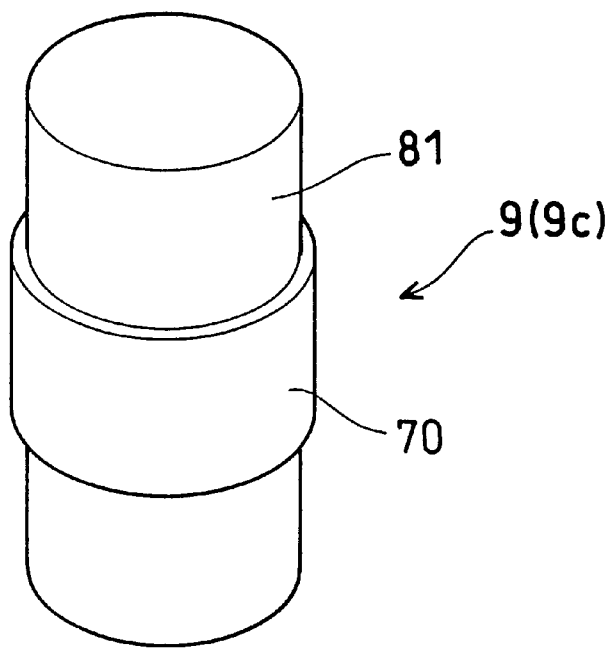
FIG. 27 is a perspective view showing a pivot shaft comprising a pin having a projection.

① The pivot shaft 9 for connecting the upper and lower connecting members 3 and 5 and the intermediate connecting member 7, may be composed by the above mentioned caulked pin 9a or a screw, but it may adopt the pin 9b having a head as shown in FIG. 23, the pin 9c having a projection 70 therearound at a middle portion thereof as shown in FIG. 27, the pin 9d having a concave groove 71 therearound at a middle portion thereof and so forth. This may be introduced in detail as follows, as a modification of the spring hinge 1 of the rimless eyeglasses G, which is, for example, referred to in the first embodiment.

Figure 24:
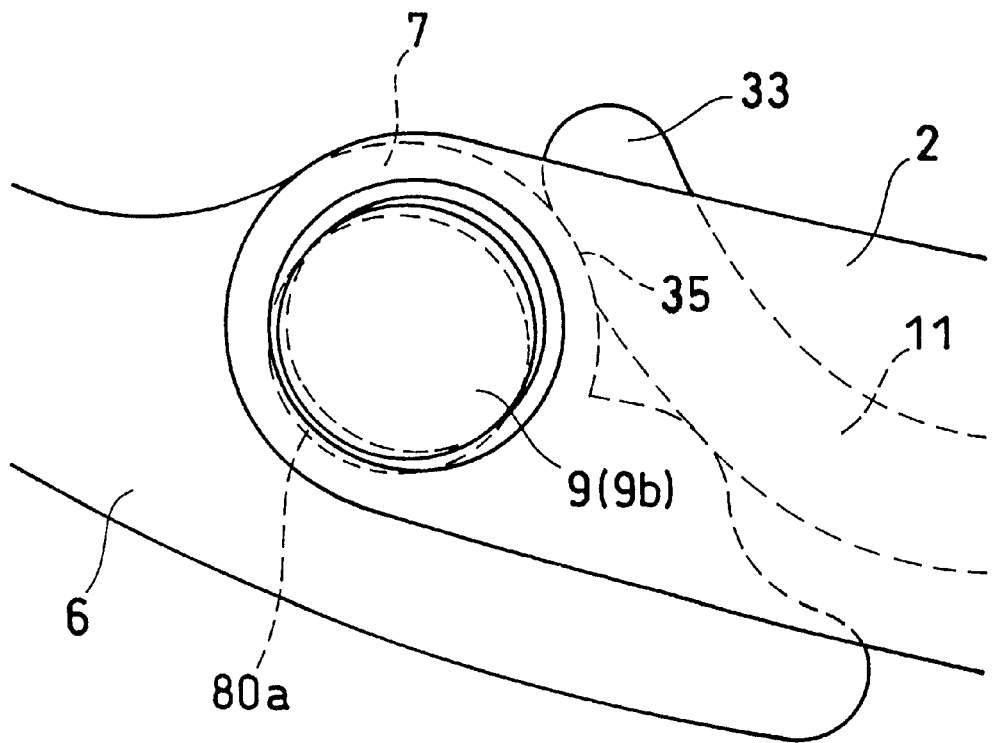
FIG. 24 is a plan view showing a state of connection of the upper and lower connecting members and the intermediate member by using the pivot shaft.
Figure 25:
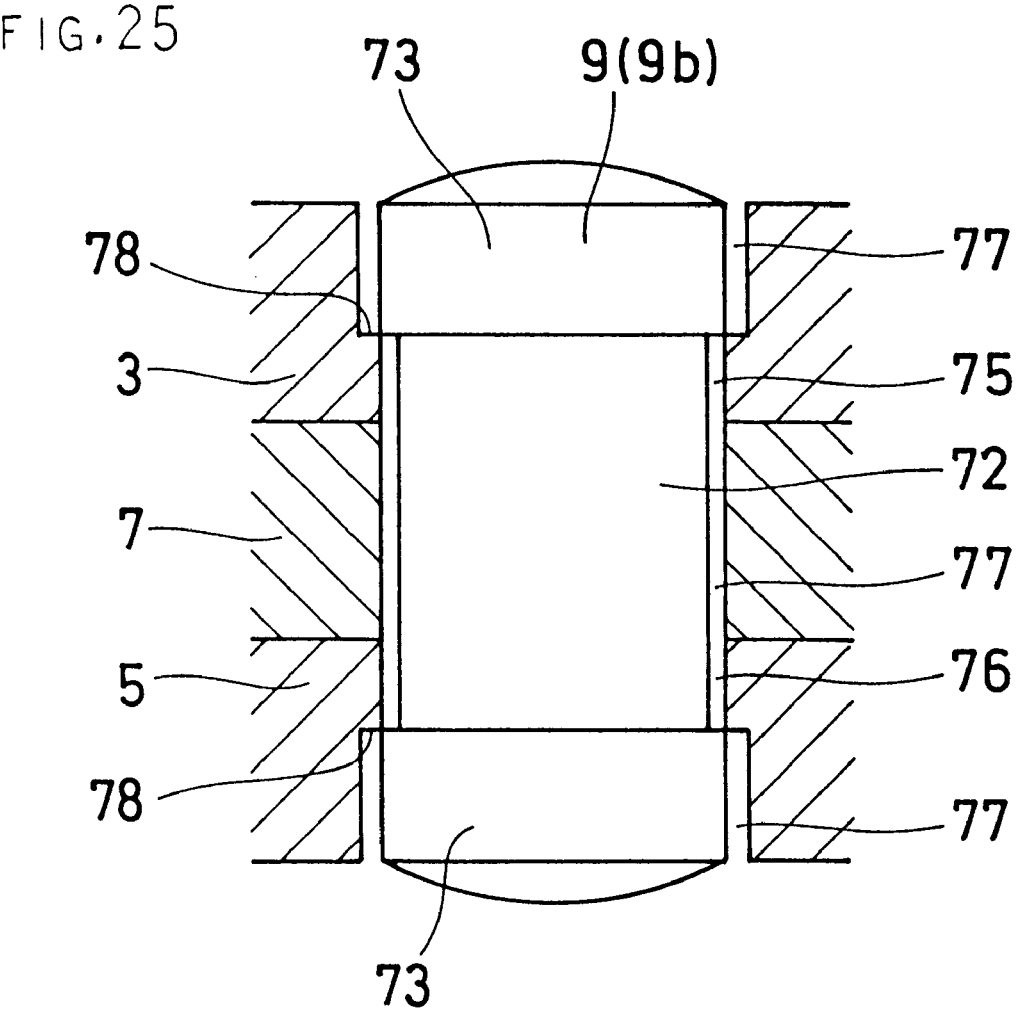
FIG. 25 is a sectional view showing a state that the pin having a head is inserted into holes of the upper and lower connecting members and a hole of the intermediate connecting member which holes are fit to one another.
Figure 26A:
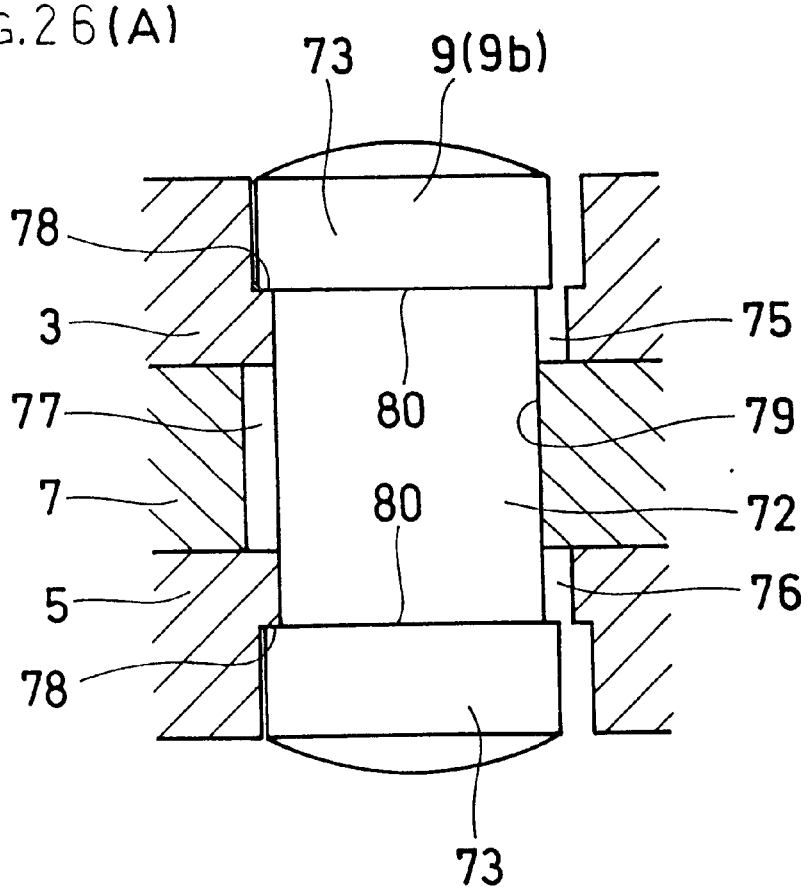
FIG. 26 is a sectional view showing a state that the pin having a head is prevented to drop out.
Figure 26B:
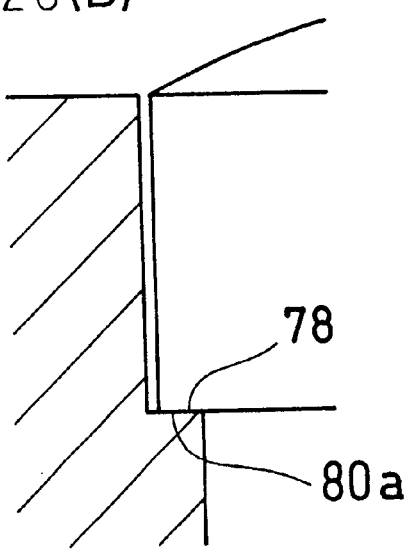

FIG. 24 shows a construction like one shown in FIG. 23. Namely, the connecting members 3, 5 and 7 are connected to both ends of a shaft 72, which ends have the same diameter, by means of a pin 9b having a large diameter head 73 which is greater than that of the shaft 72. In this case, shaft holes 75, 76 and 77 are formed with the upper and lower connecting members 3 and 5 and the intermediate connecting member 7, as shown in FIG. 25. The shaft holes have a diameter slightly greater than that of the shaft portion 72, and substantially the same diameter as that of the head 73. A receiving hole portion 77, which has a diameter slightly greater than that of the head, is provided via a step 78 in the up and down shaft holes 75 and 76. The pin 9b having a head is inserted into the shaft holes 75, 76 and 77, each of the axis of which are fit together, as shown in FIG. 25, so that the head 73 may be positioned in the receiving hole portion. And, the flexible press portion 33 of the spring 11 flexibly presses the arc periphery 35 of the intermediate connecting member 7, as shown in FIG. 24, so that the shaft portion 72 may be moved under pressure of an inside surface 79 of the shaft hole 77 of the connecting member 7, as shown in FIG. 26. As a result, portions 80a and 80a which form reverse surfaces 80 and 80 of the up and down heads, engage with the step 78 so as to prevent the pin 9b having a head from disengaging.

Figure 28:
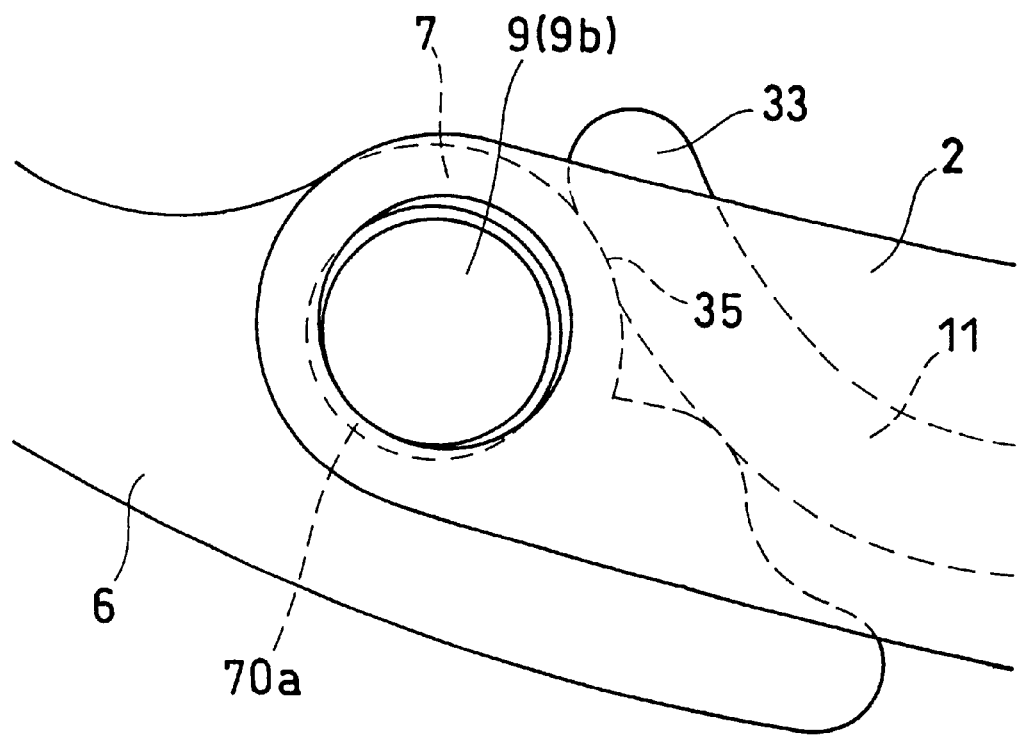
FIG. 28 is a plan view showing a state of connection of the upper and lower connecting members and the intermediate member by using the pivot shaft.
Figure 29:
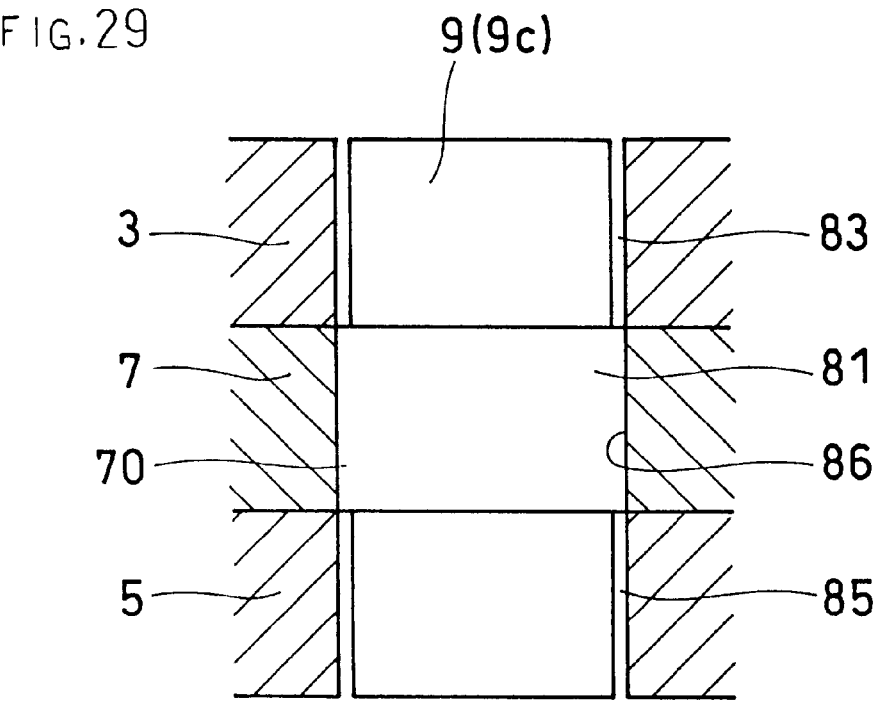
FIG. 29 is a sectional view showing a state that the pin having a projection is inserted into holes of the upper and lower connecting members and a hole of the intermediate connecting member which holes are fit to one another.

Further, FIG. 28 shows a composition that the connecting members 3, 5 and 7 are connected to a part of the periphery of a shaft portion 81, as shown in FIG. 27, by using a pin 9c having a projection 70 which continues in a peripheral direction, wherein it shows a state that the intermediate connecting member 7 is inserted into a shaft hole 86. In this case, as shown in FIG. 29, shaft holes 83, 85 and 86, which have a diameter slightly greater than that of the shaft portion 81, are formed with the upper and lower connecting members 3 and 5 and the intermediate connecting member 7. And, the pin 9c having a projection is inserted into the shaft holes 83, 85 and 86 each of the axis of which holes fit to one another, as shown in FIG. 29.

Figure 30:
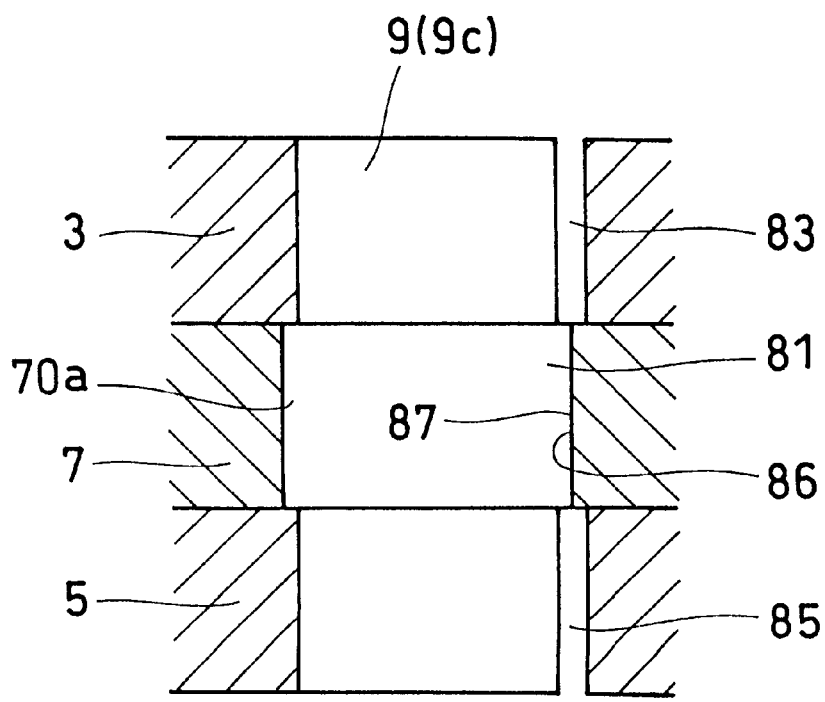
FIG. 30 is a sectional view showing a state that the pivot shaft comprising the pin having the projection connects the upper and lower connecting members and the intermediate connecting member.

Further, the flexible press portion 33 of the spring 11 flexibly presses the arc periphery 35 of the intermediate connecting member 7, as shown in FIG. 28, so that the shaft portion 81 may be moved under pressure of an inside surface 87 of the shaft hole 86 of the connecting member 7, and then the up and down shaft holes 83 and 85 are shifted with respect to the intermediate shaft hole 86. As a result, as shown in FIG. 30, a portion 70a, which forms a forward portion of the projection 70 in its moving direction, becomes in a state that it fits into between the up and down connecting members 3 and 5, so that the pin 9c having a projection may be prevented from disengaging.

Figure 31:
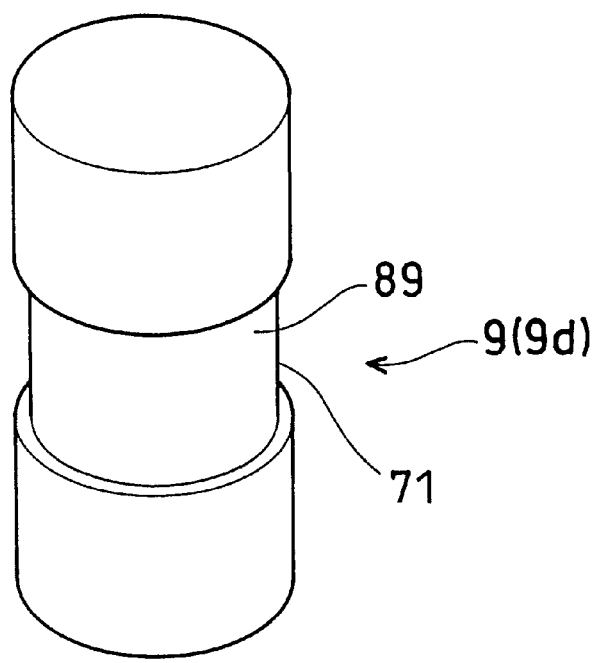
FIG. 31 is a perspective view showing a pivot shaft comprising a pin having a concave groove.
Figure 32:
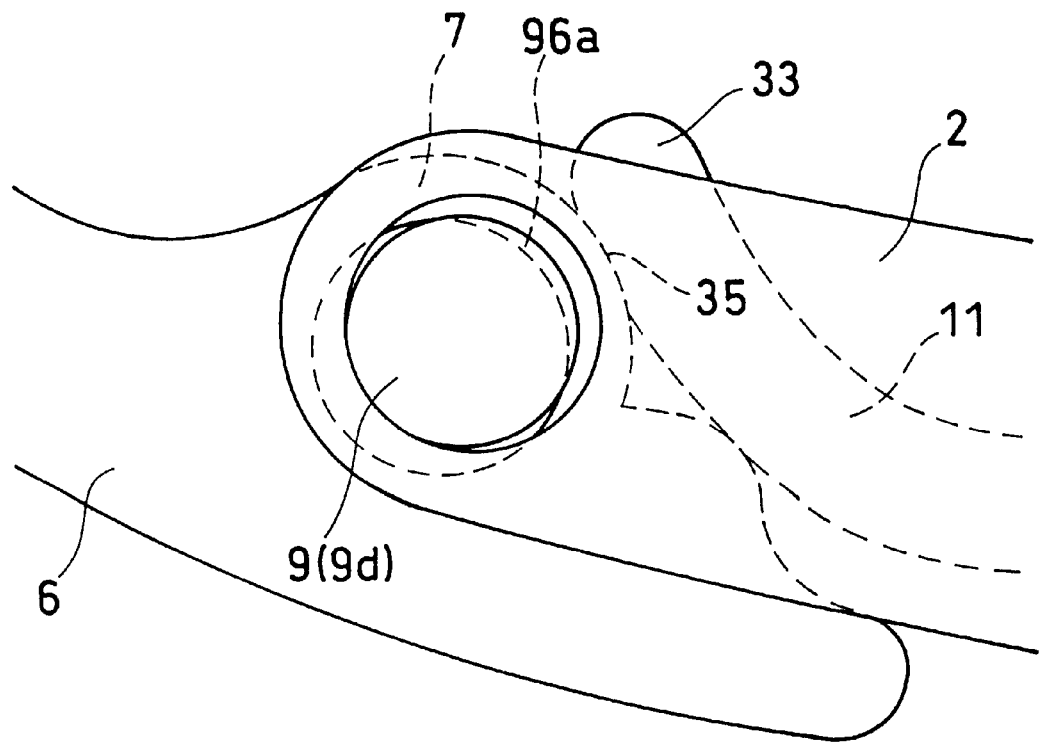
FIG. 32 is a plan view showing a state of connection of the upper and lower connecting members and the intermediate member by using the pivot shaft.
Figure 33:
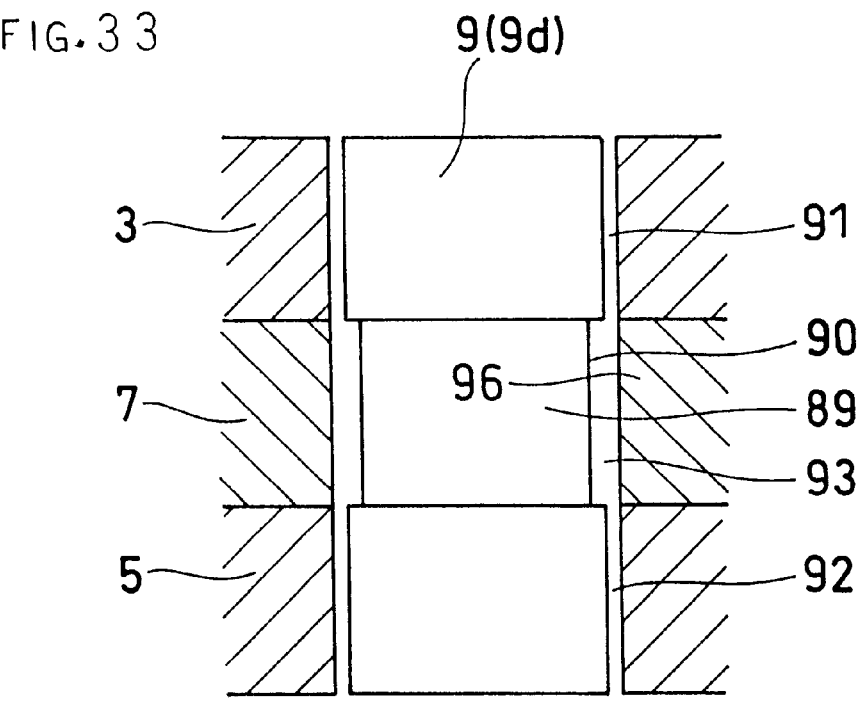
FIG. 33 is a sectional view showing a state that the pin having a concave groove is inserted into holes of the upper and lower connecting members and a hole of the intermediate connecting member which holes are fit to one another.
Figure 34:
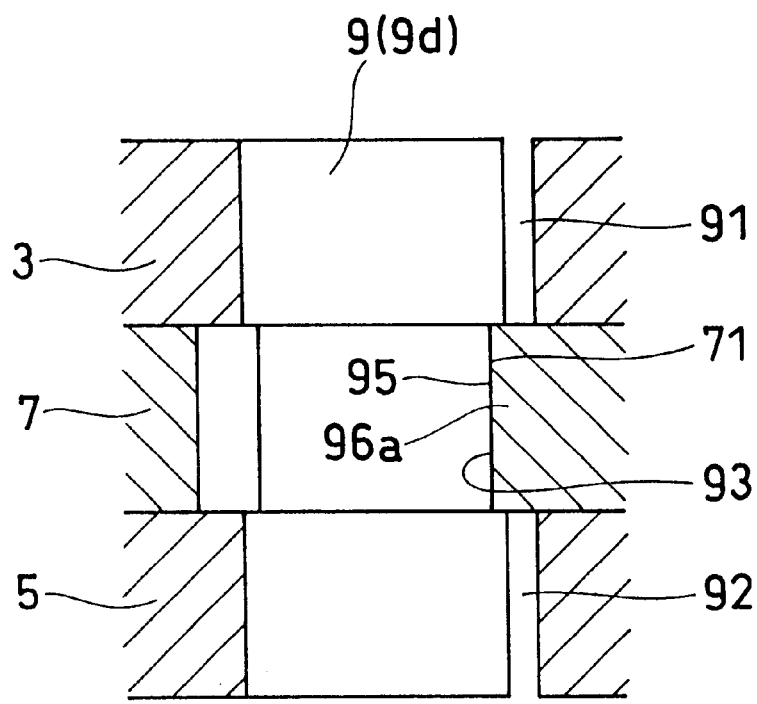
FIG. 34 is a plan view showing a state of connection of the upper and lower connecting members and the intermediate member by using the pivot shaft.
Figure 35:
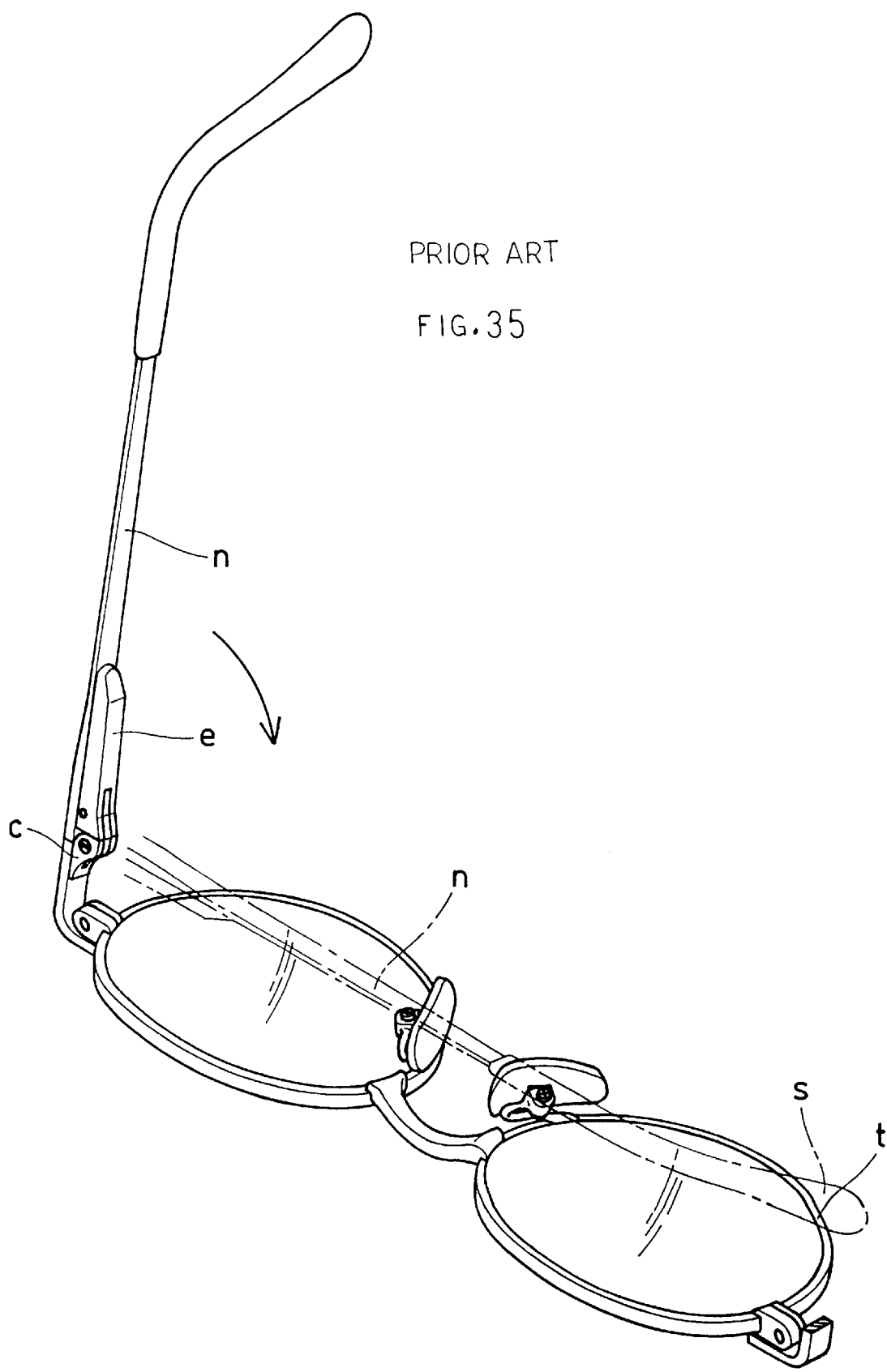
FIG. 35 is a plan view showing a conventional spring hinge together with its problems.
Figure 36:
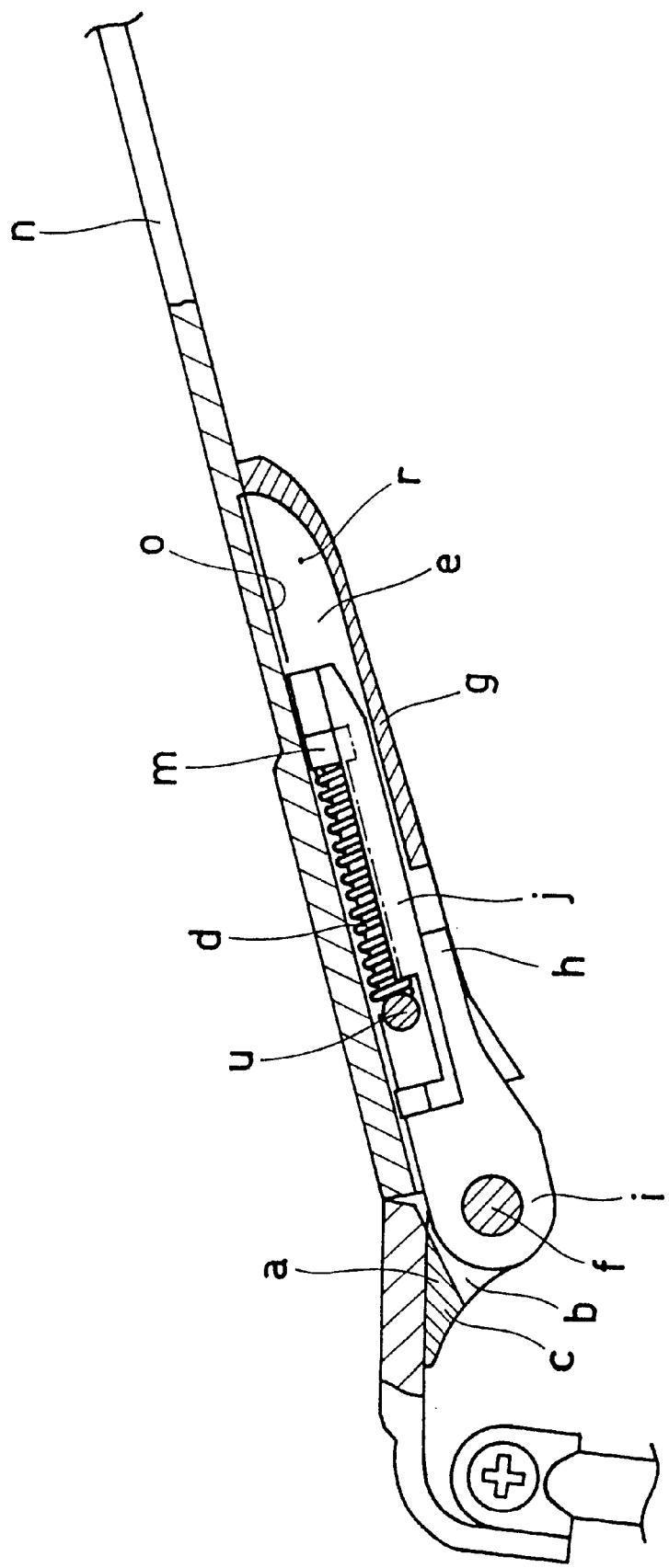
FIG. 36 is a sectional view for describing a construction of the conventional spring hinge.
Figure 37:
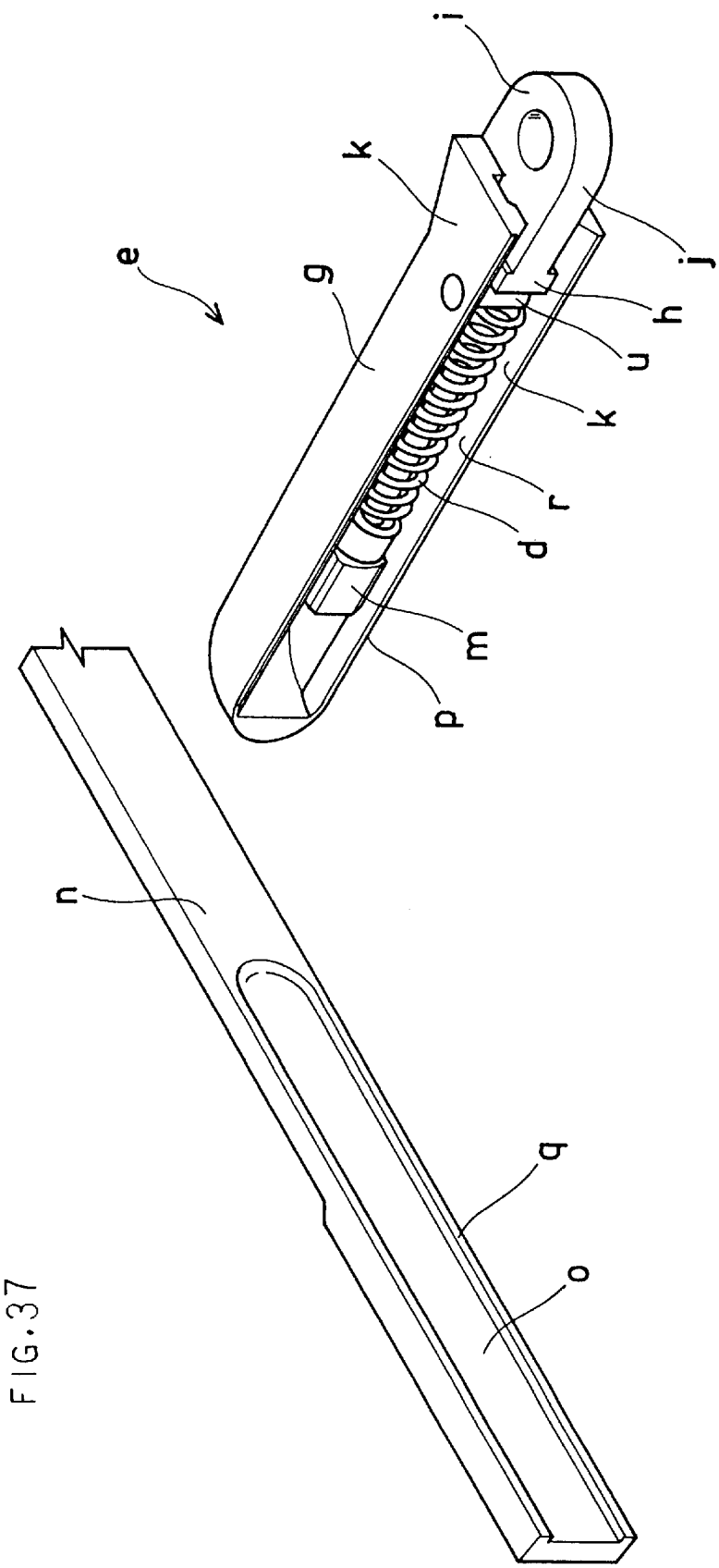
FIG. 37 is a perspective view showing a construction of the conventional spring hinge disassembled.
Figure 38:
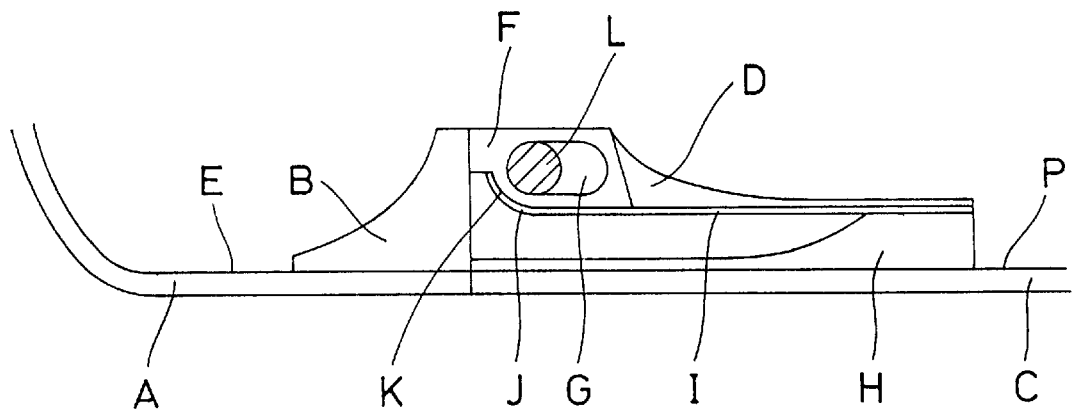
FIG. 38 is a plan view showing another aspect of a conventional spring hinge.
Figure 39:
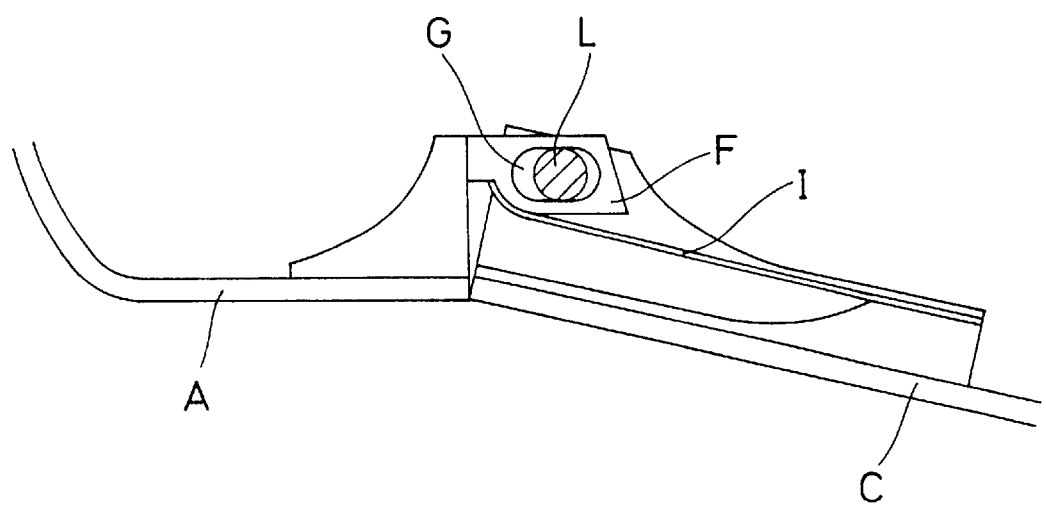
FIG. 39 is a plan view showing a state that a temple is opened flexibly in the case of eyeglasses using the spring hinge.
Figure 40:
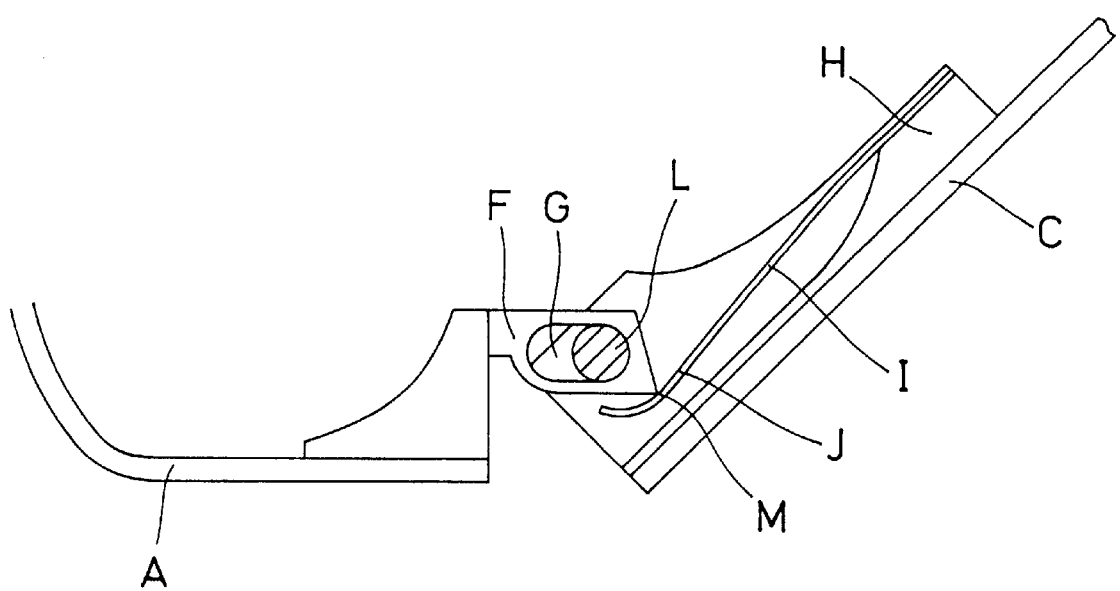
FIG. 40 is a plan view showing a state that the temple is on the way of folding in the case of the eyeglasses using the spring hinge.
Figure 41:
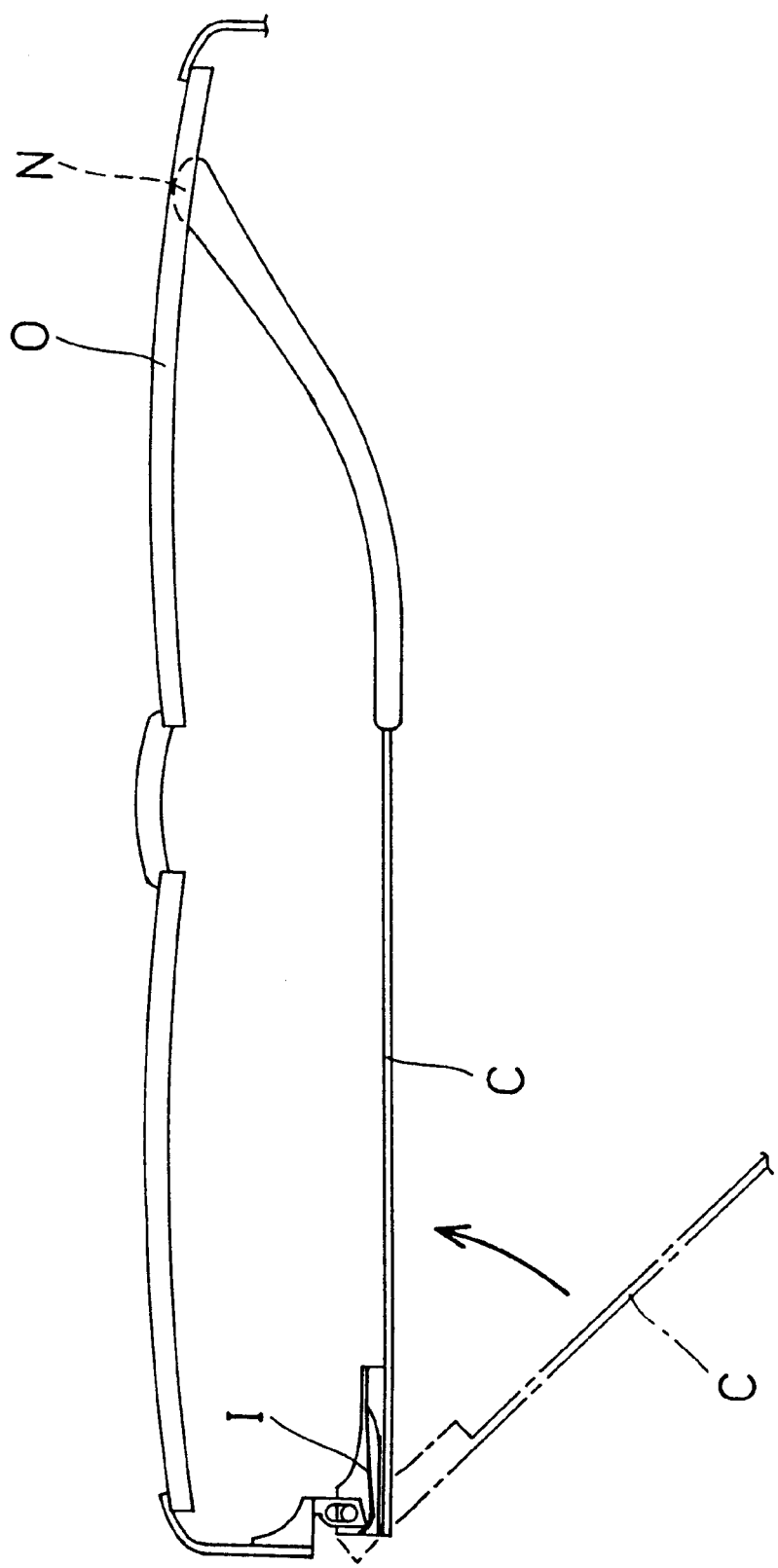
FIG. 41 is a plan view showing a state that the temple is folded in the eyeglasses using the spring hinge.
Figure 42:
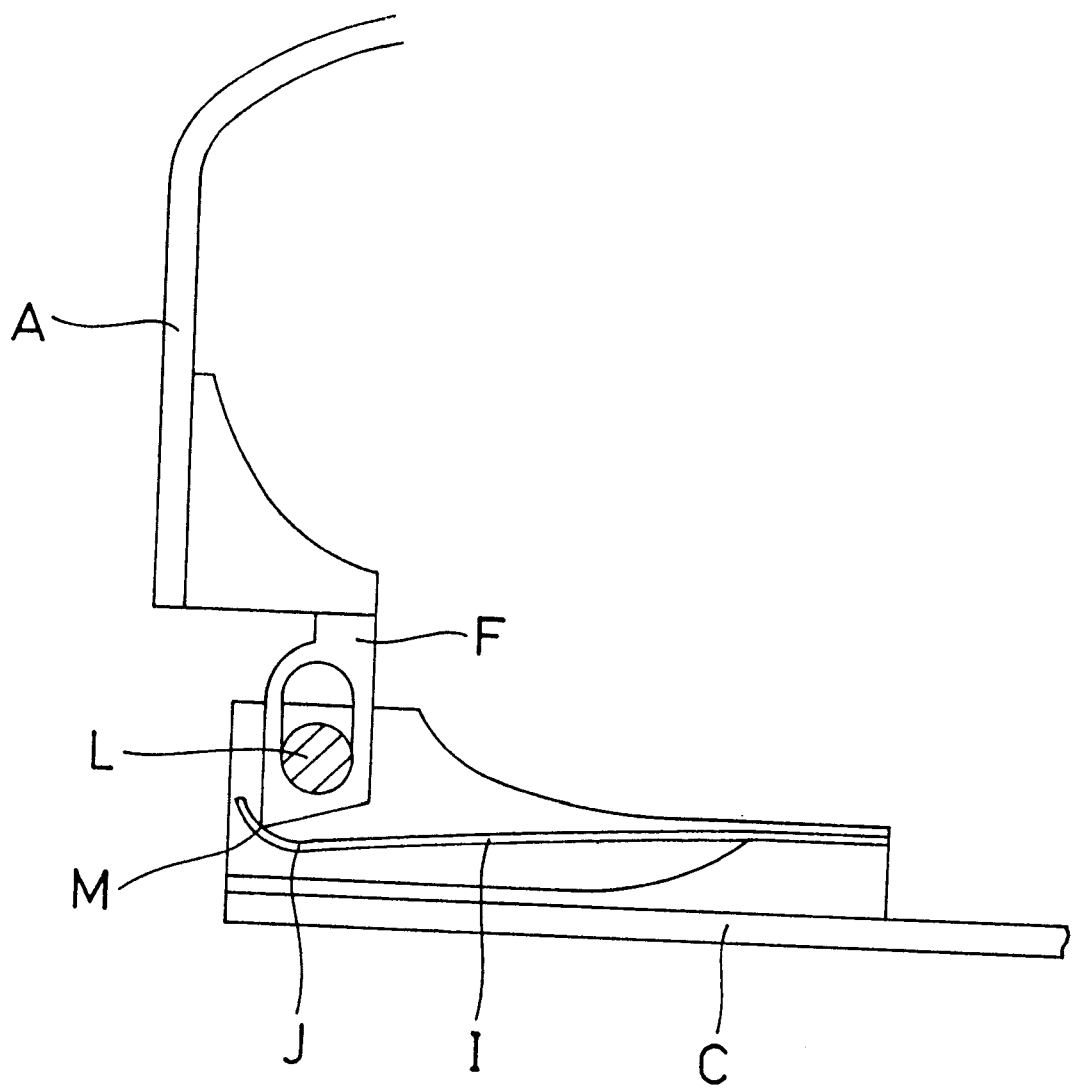
FIG. 42 is a plan view showing the hinge enlarged, in a state that the temple is folded in the case of the eyeglasses using the spring hinge.

Furthermore, FIG. 32 shows a composition that the connecting members 3, 5 and 7 are connected to a part of the periphery of a shaft portion 89, as shown in FIG. 31, by using a pin 9d having a concave groove 71 which is continuously formed therewith in a peripheral direction, wherein it shows a state that the intermediate connecting member 7 is inserted into a shaft hole 93. In this case, as shown in FIG. 33, shaft holes 91, 92 and 93, which have a diameter slightly greater than that of the shaft portion 89, are formed with the upper and lower connecting members 3 and 5 and the intermediate connecting member 7. And, the pin 9d having a groove is inserted into the shaft holes 91, 92 and 93, each of the axis of which holes fit to one another, as shown in FIG. 33. Further, the flexible press portion 33 of the spring 11 flexibly presses the arc periphery 35 of the intermediate connecting member 7, as shown in FIG. 32, so that the shaft portion 89 may be moved under pressure of an inside surface 95 of the shaft hole 93 of the connecting member 7, and then the up and down shaft holes 91 and 92 are shifted with respect to the intermediate shaft hole 93. As a result, as shown in FIG. 34, a portion 96a, which forms this side portion of a peripheral portion 96 of the shaft hole 93, toward its moving direction, becomes in a state that it fits into the concave groove 71, so that the pin 9d having a groove may be prevented from disengaging.

② In this invention, the spring 11 is not limited to one like a line which is mentioned above.

③ As attaching means of the spring 11 to the temple or the armor, it may adopt such means, for example, caulked pin, brazing, adhesion and the like, other than the above mentioned screw means.

What is claimed is:

1. A spring hinge for eyeglasses which pivotally connects the temples of the eyeglasses to an armor of the eyeglasses, and allows the temples of the eyeglasses to pivot from a normal open position, in which the eyeglasses are wearable, inwardly to a folded position, and which further allows the temple to pivot outwardly beyond the normal open position, the spring hinge comprising;

upper and lower connecting members provided on the inside of the temple, said members facing toward each other leaving a predetermined spacing therebetween;

a pivot shaft for pivotably connecting the upper and lower connecting members to the armor of the glasses so that a temple may be folded from the normal open position inwardly to the folded position and vice versa;

the armor having an arc periphery on its inside, which arc periphery is generally circular, with the pivot shaft being at its center, said armor having an extension (21) which extends beyond the arc periphery;

a spring member provided on the inside of the temple said spring member having a flexible press portion for flexibly pressing the inside of the armor at the arc periphery during normal folding and unfolding of the glasses;

the extension being positioned on the outside of the arc periphery such that an inside surface of the extension engages the spring when the temple is unfolded to its normal open position;

whereby, when the temple is in the normal open position, and a sufficient additional force is exerted outwardly on the temple, the inside surface of the extension presses on the spring and bends it inwardly, thus allowing the temple to pivot outwardly beyond its normal open position.

2. The spring hinge for eyeglasses as claimed in claim 1, wherein said spring member is formed to be generally linear having flexibility, and its front portion is formed to be the flexible press portion and a portion of the spring member adjacent its rear end is attached on the side of the temple.

3. The spring hinge for eyeglasses as claimed in claim 2, wherein a portion of the flexible press portion, which contacts the arc periphery, is formed to have a curved face which contacts the arc periphery with face to face contact.

4. A spring hinge for eyeglasses which pivotally connects the temples of the eyeglasses to an armor of the eyeglasses, and allows the temples of the eyeglasses to pivot from a normal open position in which the eyeglasses are wearable, inwardly to a folded position and which further allows the temple to pivot outwardly beyond the normal open position, the spring hinge comprising;

upper and lower connecting members provided on the inside of one of the temple or armor, said members facing toward each other leaving a predetermined spacing therebetween;

a pivot shaft for pivotably connecting said upper and lower connecting members to the other of said temple or armor of the eyeglasses so that the temple may be folded from the normal open position inwardly to the folded position and vice versa;

the other of said temple or armor having an arc periphery on its inside, which arc periphery is generally circular, with the pivot shaft being at its center and an extension which extends beyond said arc periphery;

a spring member provided on the inside of said one of the temple or armor, said spring member having a flexible press portion for flexibly pressing the inside of the other of said temple or armor at the arc periphery during normal folding and unfolding of the glasses, the extension being positioned on the outside of the arc periphery such that an inside surface of the extension engages the spring when the temple is unfolded to its normal open position;

whereby, when the temple is in the normal open position, and a sufficient additional force is exerted outwardly on the temple, the inside surface of the extension presses on the spring and bends it inwardly, this allowing the temple to pivot outwardly beyond its normal open position.

5. A spring hinge for eyeglasses which pivotally connections the temples of the eyeglasses to an armor of the eyeglasses, and allows the temples of the eyeglasses to pivot from a normal open position, in which the eyeglasses are wearable, inwardly to a folded position, and which further allows the temple to pivot outwardly beyond the normal open position, the spring hinge comprising;

upper and lower connecting members provided on the inside of the armor, said members facing toward each other leaving a predetermined spacing therebetween;

a pivot shaft for pivotably connecting the upper and lower connecting members to the temple so that a temple may be folded from the normal open position inwardly to the folded position and vise versa;

the temple having an arc periphery on its inside, which arc periphery is generally circular, with the pivot shaft being at its center, said temple having an extension (56) which extends beyond the arc periphery;

a spring member provided on the side of the armor, said spring member having a flexible press portion for flexibly pressing the inside of the temple at the arc periphery during normal folding and unfolding of the glasses;

the extension being positioned on the outside of the arc periphery such that an inside surface of the extension engages the spring when the temple is unfolded to its normal open position;

whereby, when the temple is in the normal open position, and a sufficient additional force is exerted outwardly on the temple, the inside surface of the extension presses on the spring and bends it inwardly, this allowing the temple to pivot outwardly beyond its normal open position.

6. The spring hinge for eyeglasses as claimed in claim 4, wherein said spring member is formed to be generally linear having flexibility, and its front portion is formed to be the flexible press portion and a portion of the spring member adjacent its rear end is attached on the side of the armor.

7. The spring hinge for eyeglasses as claimed in claim 5, wherein a portion of the flexible press portion, which contacts the arc periphery, is formed to have a curved face which contacts the arc periphery with face to face contact.

* * * * *